US012378078B1

(12) United States Patent
Kalm et al.

(10) Patent No.: US 12,378,078 B1
(45) Date of Patent: Aug. 5, 2025

(54) CONTAINER MANAGEMENT SYSTEM

(71) Applicant: Amazon Technologies, Inc., Seattle, WA (US)

(72) Inventors: William Scott Kalm, Seattle, WA (US); Seshachalamgupta Motamarri, Sammamish, WA (US); Bart Heerikhuizen, Harderwijk (NL); Vincent Kerstholt, Harderwijk (NL); Frank van Ommeren, Harderwijk (NL); Ernst Bahlman, Harderwijk (NL)

(73) Assignee: Amazon Technologies, Inc., Seattle, WA (US)

( * ) Notice: Subject to any disclaimer, the term of this patent is extended or adjusted under 35 U.S.C. 154(b) by 839 days.

(21) Appl. No.: 17/489,257

(22) Filed: Sep. 29, 2021

(51) Int. Cl.
B65G 1/137 (2006.01)
B25J 9/00 (2006.01)
B25J 15/00 (2006.01)
B65G 1/06 (2006.01)

(52) U.S. Cl.
CPC ........ B65G 1/1375 (2013.01); B25J 15/0019 (2013.01); B25J 15/0028 (2013.01); B25J 15/0033 (2013.01); B25J 15/0066 (2013.01); B65G 1/06 (2013.01); B25J 9/0093 (2013.01)

(58) Field of Classification Search
CPC ................................ B65G 1/1375; B65G 1/06
See application file for complete search history.

(56) References Cited

U.S. PATENT DOCUMENTS

| 2,942,395 A | 6/1960 | Thoren | |
| 6,974,164 B2 * | 12/2005 | Brewster | B61D 45/007 410/70 |
| 9,378,482 B1 * | 6/2016 | Pikler | G05D 1/0297 |
| 2007/0106422 A1 | 5/2007 | Jennings et al. | |
| 2017/0166399 A1 * | 6/2017 | Stubbs | G06Q 10/087 |
| 2019/0031349 A1 | 1/2019 | Schliwa et al. | |
| 2020/0269283 A1 * | 8/2020 | Ulrich | B07C 3/008 |

FOREIGN PATENT DOCUMENTS

| CN | 101842303 A | | 9/2010 | |
| CN | 108466843 A | * | 8/2018 | B65G 61/00 |
| DE | 3800115 A | * | 7/1988 | A47J 27/14 |
| WO | WO-2018129362 A1 | * | 7/2018 | B65G 1/137 |

(Continued)

OTHER PUBLICATIONS

CN 108466843, "A Stacking Station for Packing Production Line", He Jun-ming (Year: 2018).*

(Continued)

Primary Examiner — Ernesto A Suarez
Assistant Examiner — Laurence R Brothers
(74) Attorney, Agent, or Firm — Kilpatrick Townsend & Stockton LLP

(57) ABSTRACT

A container transport can move containers around a warehouse environment. The container transport can include a support that can connect the container transport with a robotic manipulator. The support can rotate the container transport between a storage position and a carrying position. In the carrying position the container can receive a container in a container receiving area. A manipulator can move the container into and/or out of container receiving area.

20 Claims, 26 Drawing Sheets

(56) References Cited

FOREIGN PATENT DOCUMENTS

WO       2018186290 A1    10/2018
WO    WO-2019232651 A1 * 12/2019  ............... B65G 1/04

OTHER PUBLICATIONS

DE 3800115, "Automatic Device for Preparing Production and Serving in Italian Pasta Dishes", Barbieri, Giovanni (Year: 1988).*
WO 2019232651, "Improved Storage and Retrieval Systems", Gravelle, et al. (Year: 2019).*
U.S. Appl. No. 17/489,267, filed Sep. 29, 2021, Titled: End of Arm Tool Inserter and Extractor.
U.S. Appl. No. 17/489,267, "Non-Final Office Action", Sep. 9, 2024, 31 pages.
U.S. Appl. No. 17/489,267, "Notice of Allowance", May 29, 2025, 11 pages.

* cited by examiner

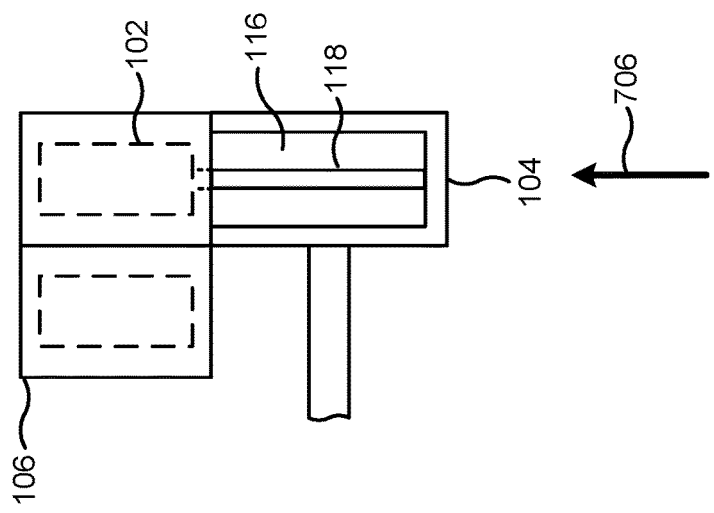
FIG. 9
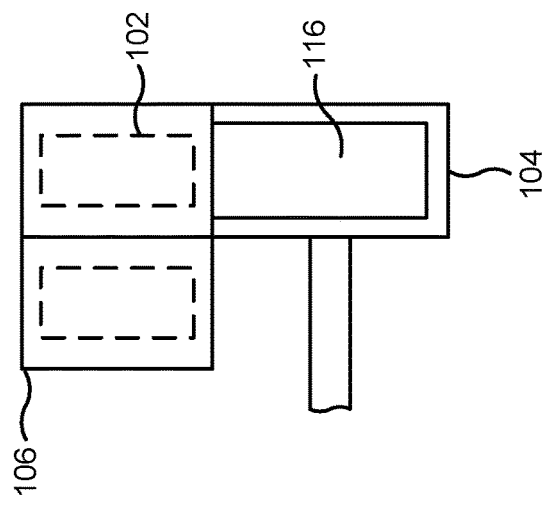
FIG. 8
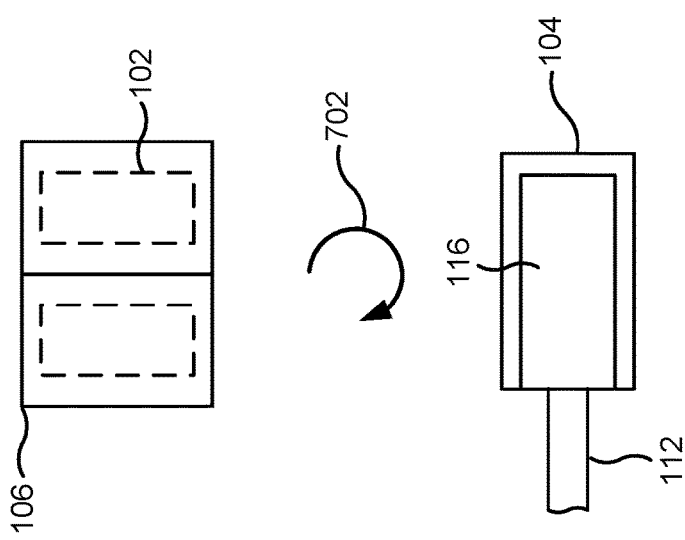
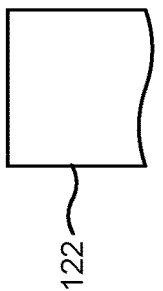
FIG. 7

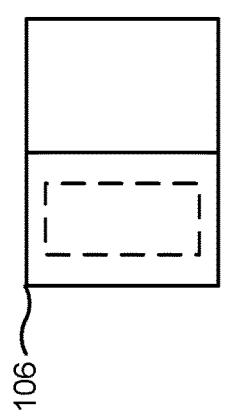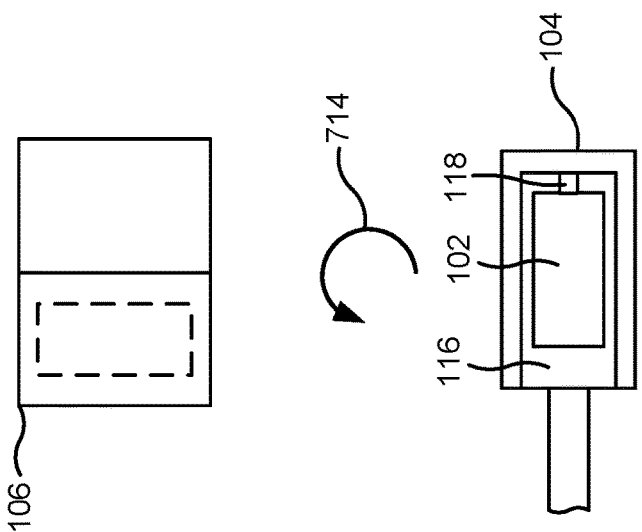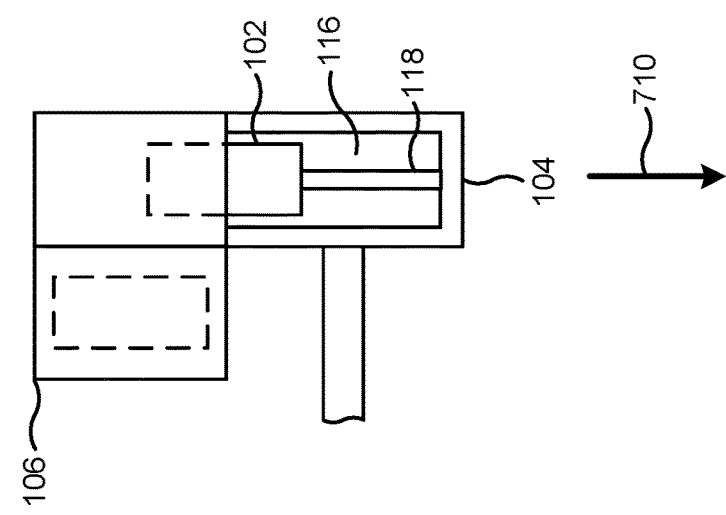

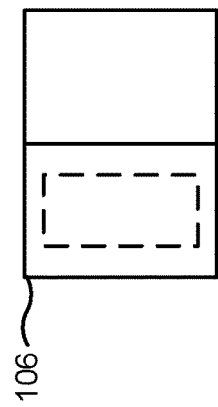
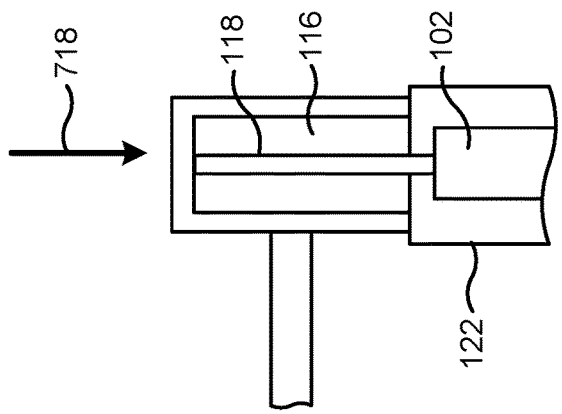
FIG. 13
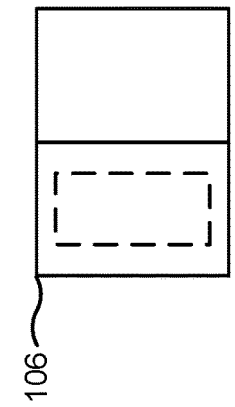
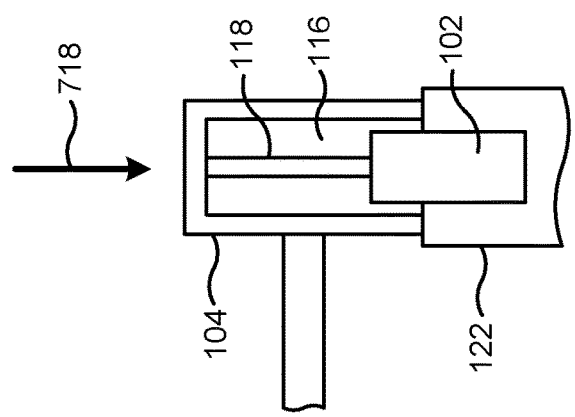
FIG. 14
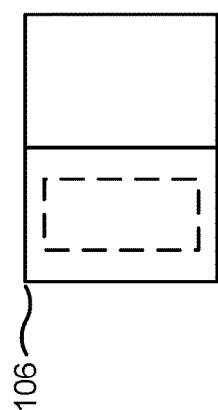
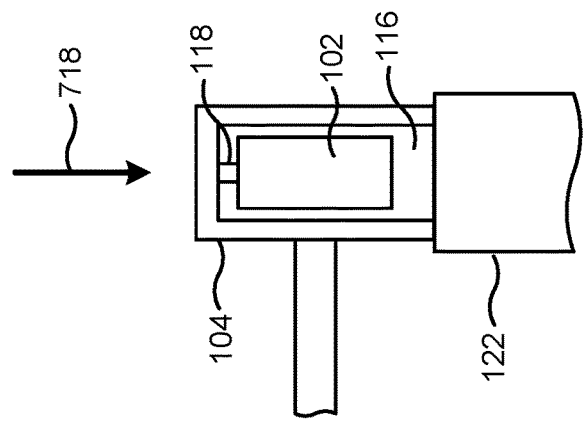
FIG. 15

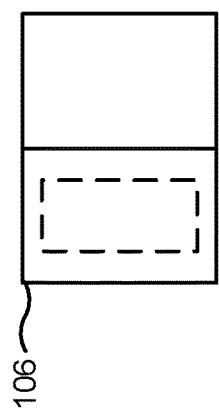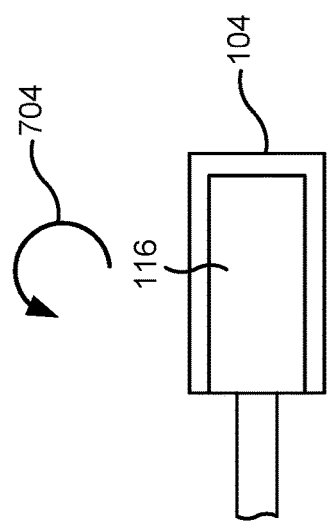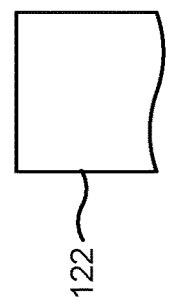

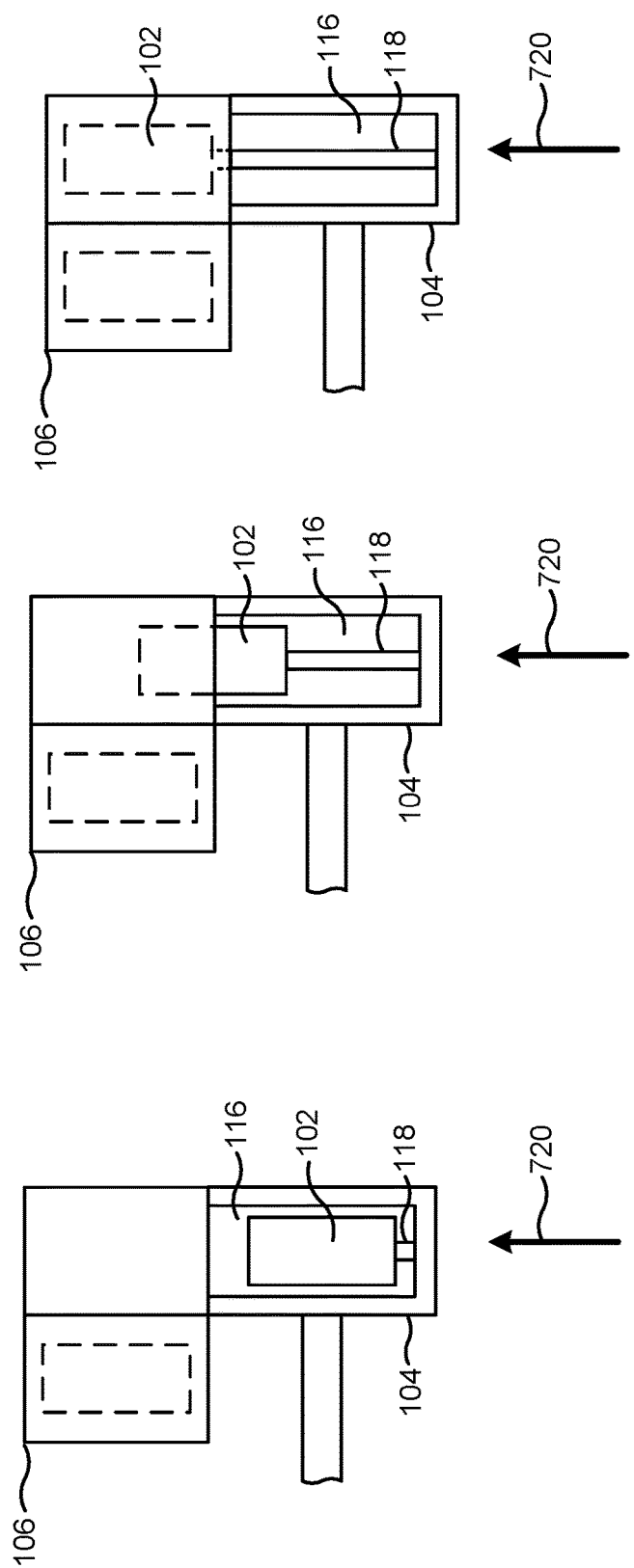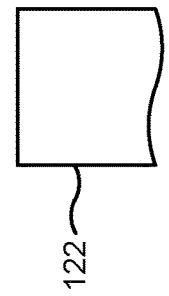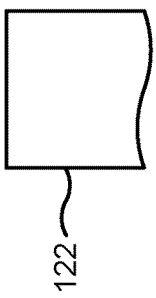

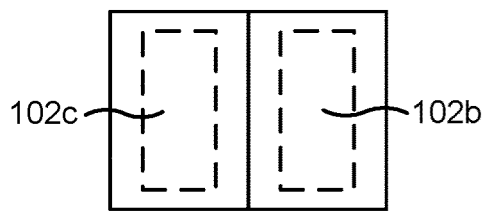
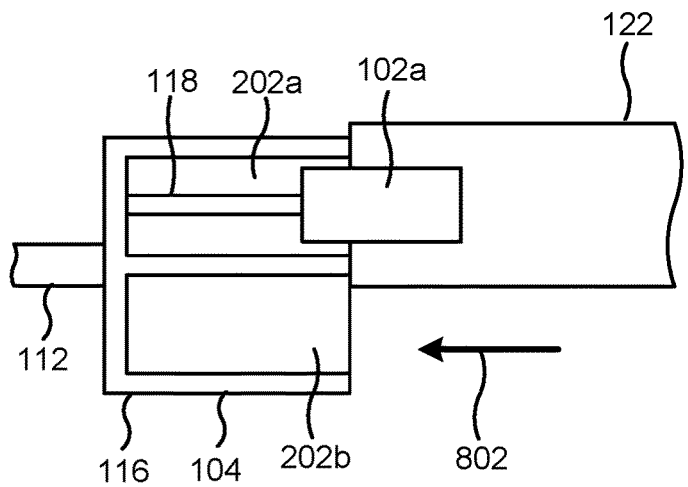
FIG. 28
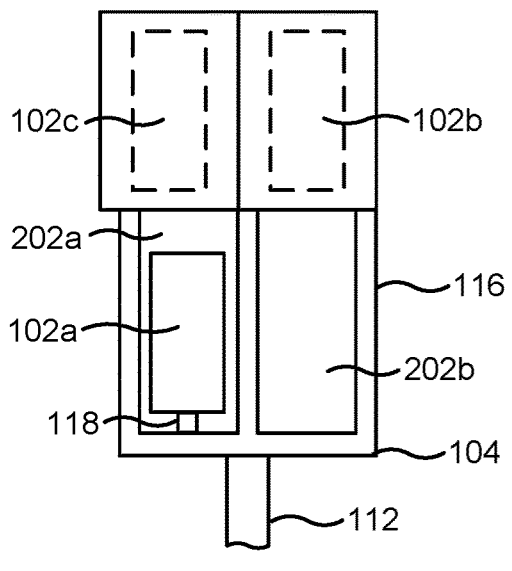
FIG. 29

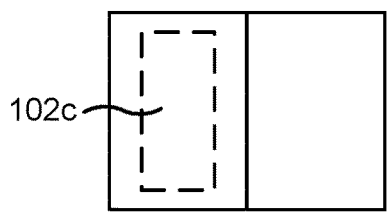
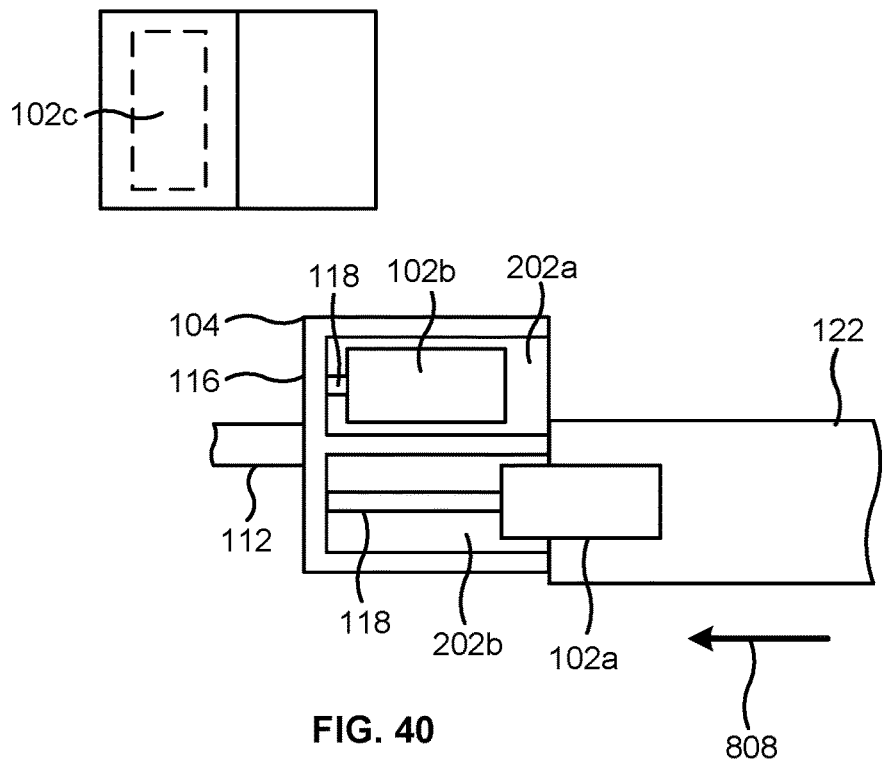
FIG. 40
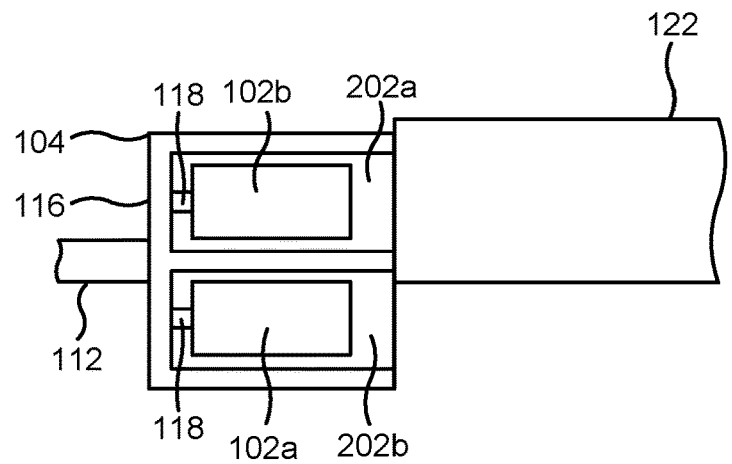
FIG. 41

CONTAINER MANAGEMENT SYSTEM

BACKGROUND

Inventory systems, such as those in warehouses, supply chain distribution centers, airport luggage systems, and custom-order manufacturing facilities, face significant challenges in storing inventory items. As the amount of inventory stored at a single location continues to grow, inefficient utilization of system resources, including space and equipment can result in lower throughput, unacceptably long response times, an ever-increasing backlog of unfinished tasks, and, in general, poor system performance. Additionally, once an inventory storage location has been filled to capacity with items and equipment, the cost of adding additional space or moving the items and equipment to a secondary location may be prohibitively expensive, limiting the ability of the location to accommodate additional items.

BRIEF DESCRIPTION OF THE DRAWINGS

Various embodiments in accordance with the present disclosure will be described with reference to the drawings, in which:

FIGS. 7 through 24 illustrate various states of components that may be implemented in a simplified example process for moving containers using the container management system of FIG. 1;

FIGS. 26 through 45 illustrate various states of components that may be implemented in a simplified example process for moving containers using the container management system of FIG. 1.

DETAILED DESCRIPTION

Figure 1:
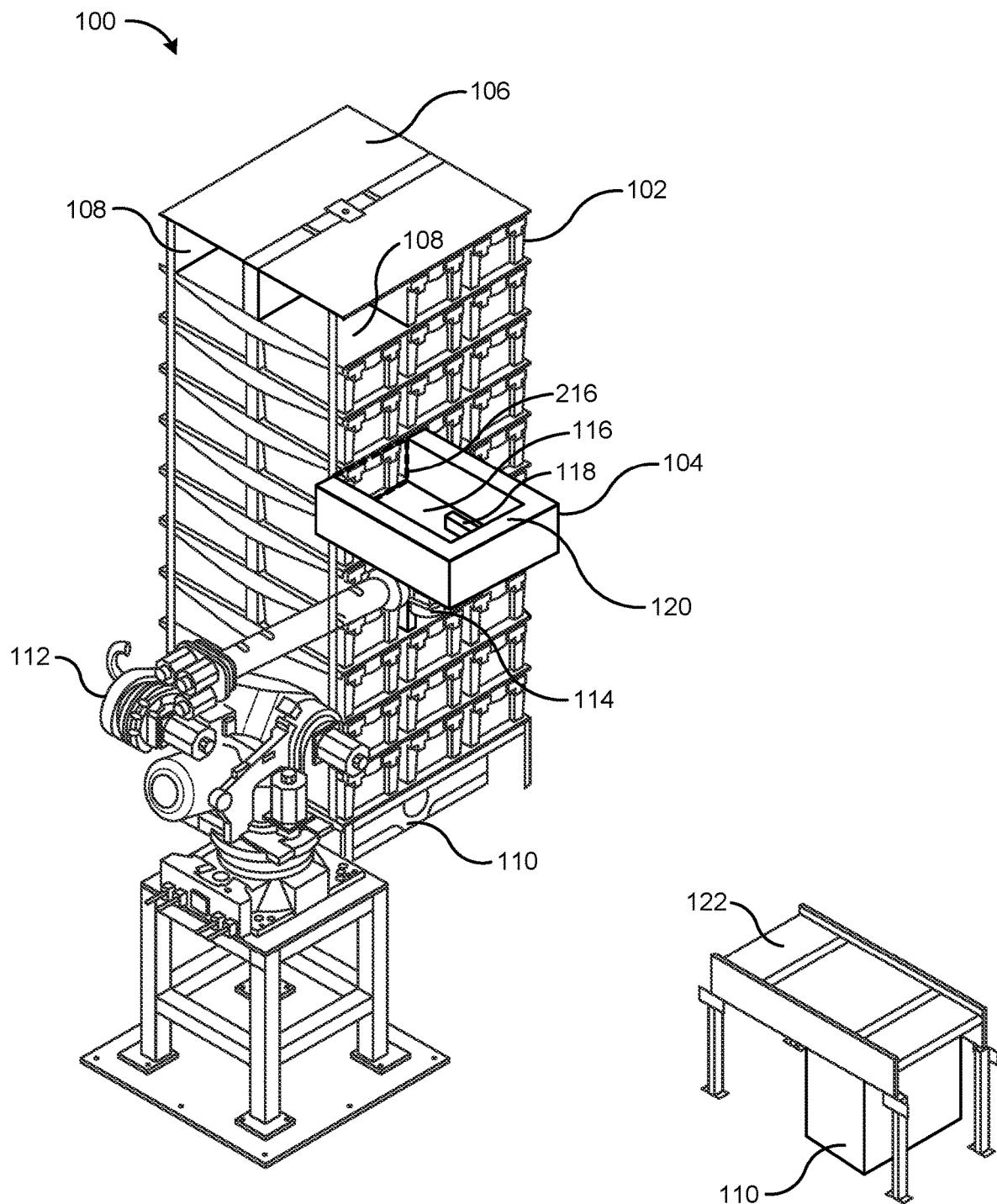
FIG. 1 illustrates a container management system, in accordance with various embodiments, for moving and managing containers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container management system for moving containers. The techniques described herein may be implemented by any suitable container management system, but particular examples are described that include a container manipulation device. The container manipulation device can be attached to a robotic manipulator. The robotic manipulator can move the container manipulation device between locations where containers are positioned. The container manipulation device can include a container receiving area. The container receiving area can include one or more bays for receiving containers. A manipulator (e.g., an extendable manipulator) can be used to move containers into and/or out of the container receiving area. For example, the manipulator can move a container from a conveyor, platform, or other container location to the container receiving area in the container manipulation device and/or from the container receiving area to a container location. The techniques described herein may include automation of portions of the process for receiving containers into the container manipulation device, moving the containers between locations, and/or depositing containers in a container location.

Turning now to a particular example, in this example, a container transport can include a support that can be connected to a robotic manipulator (e.g., a robotic arm). The support can rotate the container transport between a storage position and a carrying position. For example, the support can rotate the container transport to a carrying position where the container transport is aligned with a container loading location. The robotic manipulator can position the container transport for receiving containers from the container loading location. The containers can be received in a container receiving area of the container transport. A manipulator can extend to a position outside of the container receiving area to engage with a container (e.g., via suction). The container manipulator can move the container into the container receiving area (e.g., by retracting to a position within the container receiving area). The robotic manipulator can move the container transport to a position for unloading the container (e.g., from the container receiving area). The support can rotate the container transport to align with a container unloading location. For example, the support can rotate the container transport to align the container receiving area with the container unloading location. The manipulator can move the container out of the container receiving area to the container unloading location. For example, the manipulator can engage with the container in the container receiving area and extend to a position outside of the container receiving area to move the container to the container unloading location. Additional containers can be moved by the container transport. For example, the container transport can move containers around a warehouse environment.

Turning now to another example, in this example, a container transport can include a container receiving area. The container receiving area can include multiple bays for receiving containers. For example, the container receiving area can include first and second container bays for receiving respective first and second containers. The containers can be moved into and/or out of the container bays using one or more manipulators. For example, each of the container bays can include a manipulator that can move the containers into and/or out of the container bays. The container transport can be connected to a robotic manipulator. The robotic manipulator can move the container transport to a position for loading and/or unloading of containers. For example, the robotic manipulator can align the first container bay with a first container loading location and a first container can be loaded into the first container bay (e.g., with the manipulator). The robotic manipulator can align the second container bay with a second container loading location and a second container can be loaded into the second container bay (e.g., with the manipulator). The robotic manipulator can then align the first container bay with the second container loading location and unload the first container (e.g., with the manipulator).

Having a container transport that is able to receive multiple containers (e.g., in multiple container bays), can decrease the cycle time of the system (e.g., the time needed for moving the containers). For example, a container can be removed and replaced without needing to unload the removed container from the container transport (e.g., which would be necessary with a system that includes a single container bay).

Turning now to the figures, FIG. 1 illustrates a container management system 100 for moving and managing containers 102 using a container transport 104, according to at least one example. As described herein, containers 102 can be positioned in a container holder 106. The container holder 106 can include a plurality of container locations 108 for holding containers 102 (e.g., container loading locations). The container holder 106 can be moved around a warehouse environment via a mobile drive unit 110, for example. The mobile drive unit 110 can move the container holder 106 to a position for removal of the containers 102 from the container locations 108.

The containers 102 can be removed from the container locations 108 by the container transport 104. The container transport 104 can be positioned to remove the containers 102 from the container locations 108 by a robotic manipulator 112. The robotic manipulator 112 can position the container transport 104 for loading of a container 102 onto the container transport 104 and/or can position the container transport 104 for unloading of the container 102. For example, the robotic manipulator 112 can move the container transport 104 between a position at or near the container holder 106 and a position at or near a conveyor 122 and/or other features or devices for receiving and/or moving the containers 102. For example, the conveyor 122 can receive containers 102 from the container transport 104 and/or position containers 102 to be received by the container transport 104. The conveyor 122 can be or include, or be replaced with a conveyance surface, motor driven rollers, a processing station for the containers 102, a station for adding and/or removing items, a station for manual handling of the containers, and/or any suitable component or components for handling one or more containers.

In various embodiments, the container transport 104 can be connected to the robotic manipulator 112 via a support 114. The support 114 can move the container transport 104 relative to the robotic manipulator 112. For example, the support 114 can rotate the container transport 104 relative to the robotic manipulator 112. The support 114 can rotate the container transport 104 between first and second manipulation positions. In some embodiments, the first and second manipulation positions can be 180 degrees apart. In the manipulation positions, the container transport 104 can be in positioned to load and/or unload the containers 102. For example, in a first manipulation position, the container transport can receive a container 102 from the container holder 106 and in the second manipulation position, the container transport can deposit a container 102 onto the conveyor 122. The container transport 104 can rotate between the first and second manipulation positions while being moved by the robotic manipulator 112 and/or among positions in the warehouse environment (e.g., between the container holder 106 and the conveyor 122).

The container transport 104 can include a container receiving area 116. The container receiving area 116 can receive one or more containers 102 (e.g., from the container locations 108). In various embodiments, the container receiving area 116 can be or include one or more container bays. The container bays can keep the containers 102 in the container receiving area 116 separate. For example, a first container 102 can be positioned in a first container bay and a second container can be positioned in a second container bay. The container receiving area 116 and/or the container bays can include sidewalls 120. The sidewalls 120 can prevent and/or constrain movement of the containers 102 (e.g., when the container transport 104 is being moved).

The container transport 104 can include a manipulator 118 that can engage with the containers 102. The manipulator 118 can include one or more components for engaging and/or moving the containers 102. In various embodiments, the manipulator 118 can be or include a manipulator (e.g., an extendable manipulator). The manipulator 118 can include an engagement device (such as an end effector 206 described elsewhere herein). The engagement device can engage with containers 102. For example, the engagement device can engage with the containers 102 to pull the containers 102 onto the container transport 104 and/or push the containers 102 off of the container transport 104. The manipulator 118 can maintain engagement with the containers 102 during movement of the containers 102. For example, the manipulator 118 can maintain engagement with the containers 102 while the container transport 104 rotates between the first manipulation position and the second manipulation position (e.g., the manipulator 118 maintains engagement from the initial engagement with the containers 102 at a first location until the containers 102 are positioned at a second location). The manipulator 118 can additionally or alternatively maintain engagement with the containers 102 while the robotic manipulator moves the container transport 104 (e.g., within the warehouse environment).

In various embodiments, the manipulator 118 can include an extendable portion. The extendable portion can be or include an actuator. For example, the actuator can be or include a linear actuator.

Moving containers 102 into and/or out of the container transport 104 (e.g., into and/or out of the container receiving area 116) can include moving the containers 102 across a plane 216. The plane 216 can define the front of the container receiving area 116 such that containers 102 positioned in the container receiving area 116 do not break the plane 216 (e.g., do not extend beyond the front of the container receiving area 116).

In some embodiments, the manipulator 118 can break the plane 216 (e.g., extend beyond the front of the container receiving area 116 to engage with the containers 102 and/or disengage with the containers 102). For example, the manipulator 118 can extend beyond the front of the plane 216 to engage with a container 102 and pull the container into the container receiving area 116 (e.g., across the plane 216). The manipulator 118 can additionally or alternatively push the container 102 out of the container receiving area 116 (e.g., across the plane 216) and disengage with the container 102 outside of the container receiving area 116.

The containers 102 can be or include a container or a bin with an interior area for containing one or more items. The containers 102 may include rigid or semi-rigid material, for example, plastic, cardboard, paper, or any suitable material for containing items. In some embodiments, the containers 102 can include handles, hooks, engagement surfaces, suctionable surfaces, or other features and/or components for engaging with the manipulator 118 and/or the container transport 104. In further embodiments, the containers 102 may be items, e.g., such that the items are moved by the container transport 104 without first being positioned in a container 102.

Multiple containers 102 can be positioned in the container holder 106 (e.g., in multiple container locations 108). The container holder 106 can include one or more faces for receiving containers 102. The faces can include shelves, walls, compartments, and/or rails for receiving the containers 102 and/or for defining the container locations 108. The container locations 108 can be arranged into vertical columns and/or horizontal rows. For example, the container holder 106 can include stacked shelves with one or more of the shelves separated into multiple compartments for receiving containers 102.

The container holder 106 and/or the conveyor 122 can be moved by a mobile drive unit 110 around the warehouse environment. However, in some embodiments, the container holder 106 and/or the conveyor 122 may additionally or alternatively include or be accompanied by a propulsion system or other system to move the container holder 106 and/or the conveyor 122. The mobile drive unit 110 can include a propulsion system and engagement components for engaging with the container holder 106 and/or the conveyor 122. The engagement components can engage with the container holder 106 and/or the conveyor 122 for movement of the container holder 106 and/or the conveyor 122. For example, the engagement components can lift the container holder 106 and/or the conveyor 122. The mobile drive unit 110 can be manually controlled to move the container holder 106 and/or the conveyor 122. However, the mobile drive unit 110 can include components for automated movement. For example, the mobile drive unit 110 can include components to automatically move toward and engage with the container holder 106 and/or the conveyor 122 and move the container holder 106 and/or the conveyor 122 into a suitable position for interaction with the container transport 104.

The robotic manipulator 112 can be or include a robotic arm moveable along multiple axes. For example, the robotic arm can be moveable along six-axes, although any other suitable number greater than or less than six could alternatively be utilized. The robotic manipulator 112 can include one or more attachment points and/or engagement components for attaching to various components. For example, the robotic manipulator 112 can attach to the container transport 104. the attachment points can include connections for power, data, air, and/or suction. In some embodiments, the attachment points can receive a harness from the container transport 104. The harness can include one or more of power lines, data lines, air lines, and/or suction line. The harness can allow the robotic manipulator 112 to control one or more components of the container transport (e.g., the manipulator 118).

In some embodiments, the robotic manipulator 112 can be positioned at a stationary point in a warehouse environment. However, the robotic manipulator 112 may be moveable around the warehouse environment, either under its own power and/or under the power of another device (e.g., a mobile drive unit 110).

In various embodiments, the robotic manipulator 112 and/or the container transport 104 can include components of a Light Detection and Ranging (Lidar) system. The Lidar system can be used to determine the position of various components of the container management system 100, for example, in the warehouse environment (e.g., the container holder 106, the robotic manipulator 112, and/or the conveyor 122). The Lidar system can additionally or alternatively be used to determine a position of the container transport 104 relative to the robotic manipulator 112. For example, the Lidar system can be used to determine the distance and direction the robotic manipulator 112 should move to position the container transport 104 next to the container holder 106.

Figure 2:
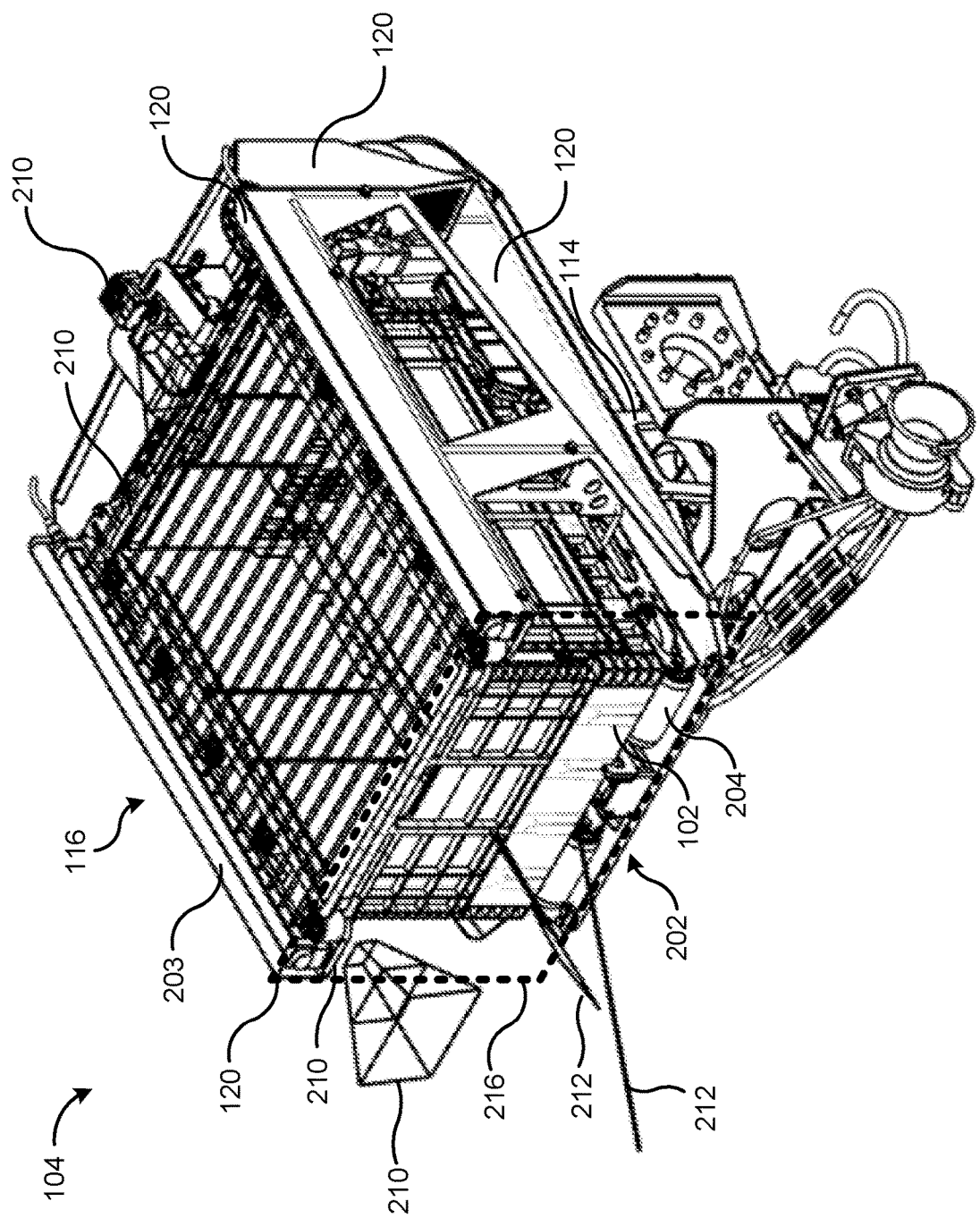
FIGS. 2 through 4 illustrate an example container manipulator for use with the container management system of FIG. 1, according to various embodiments.
Figure 3A:
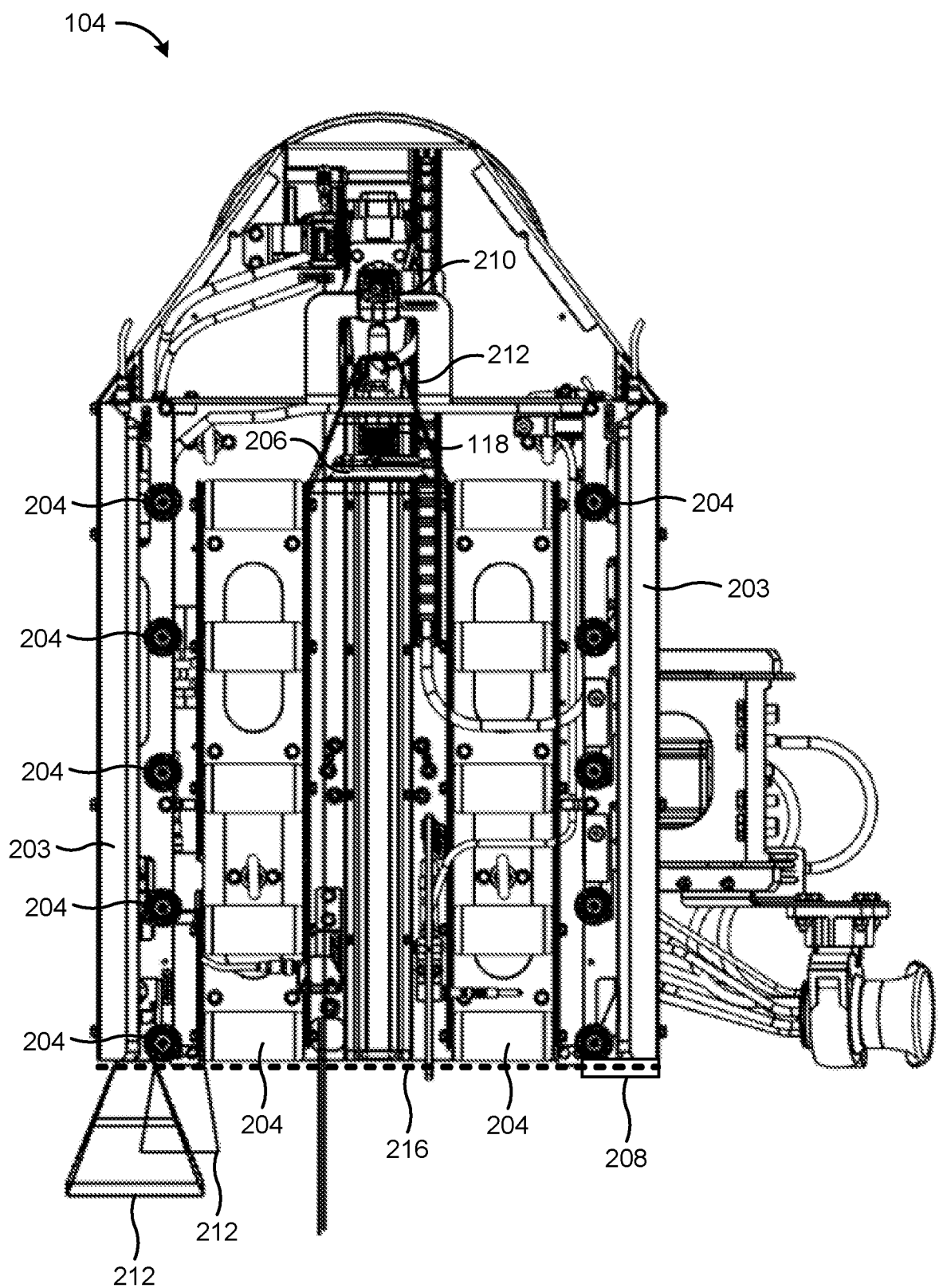
Figure 3B:
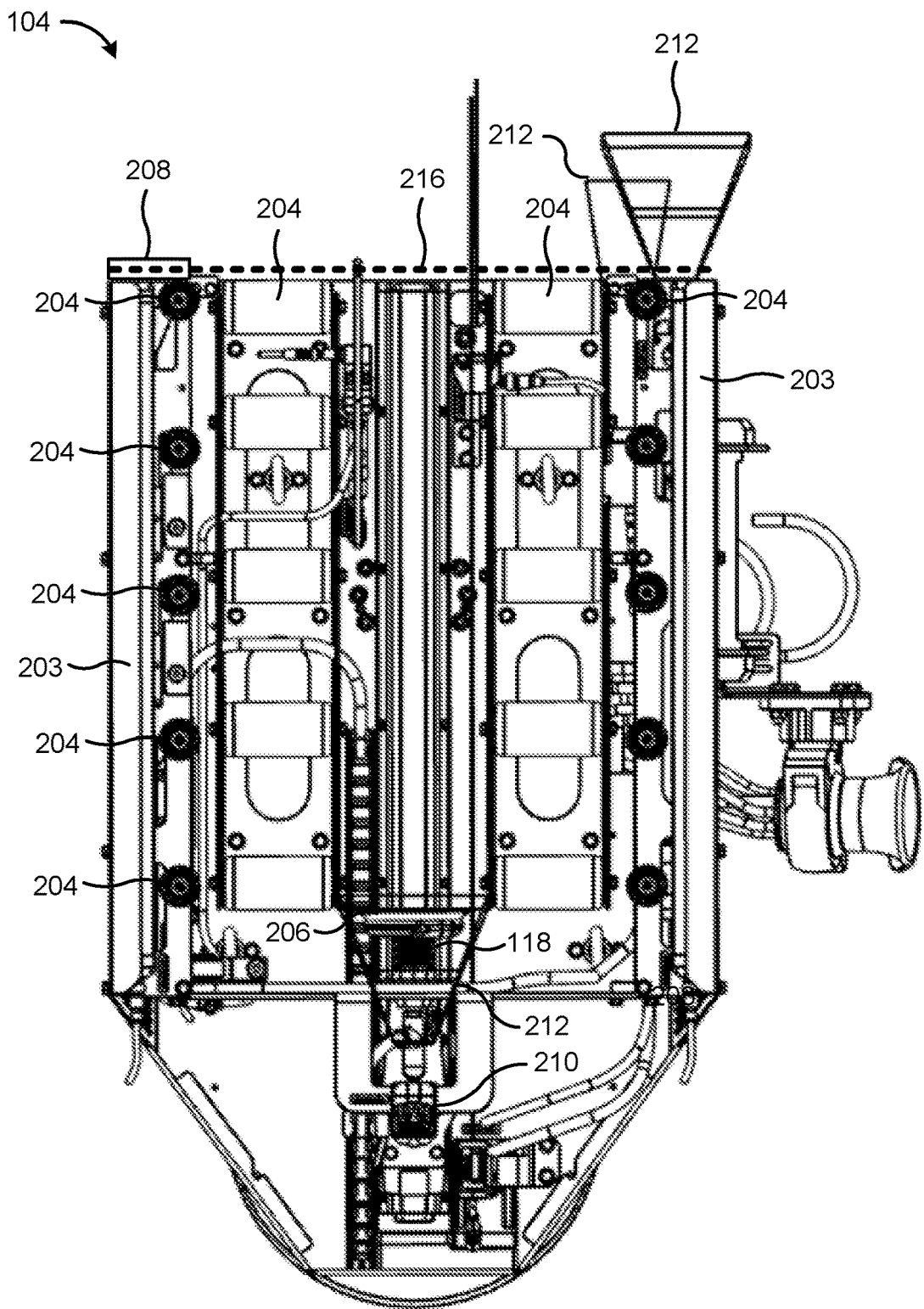
Figure 4:
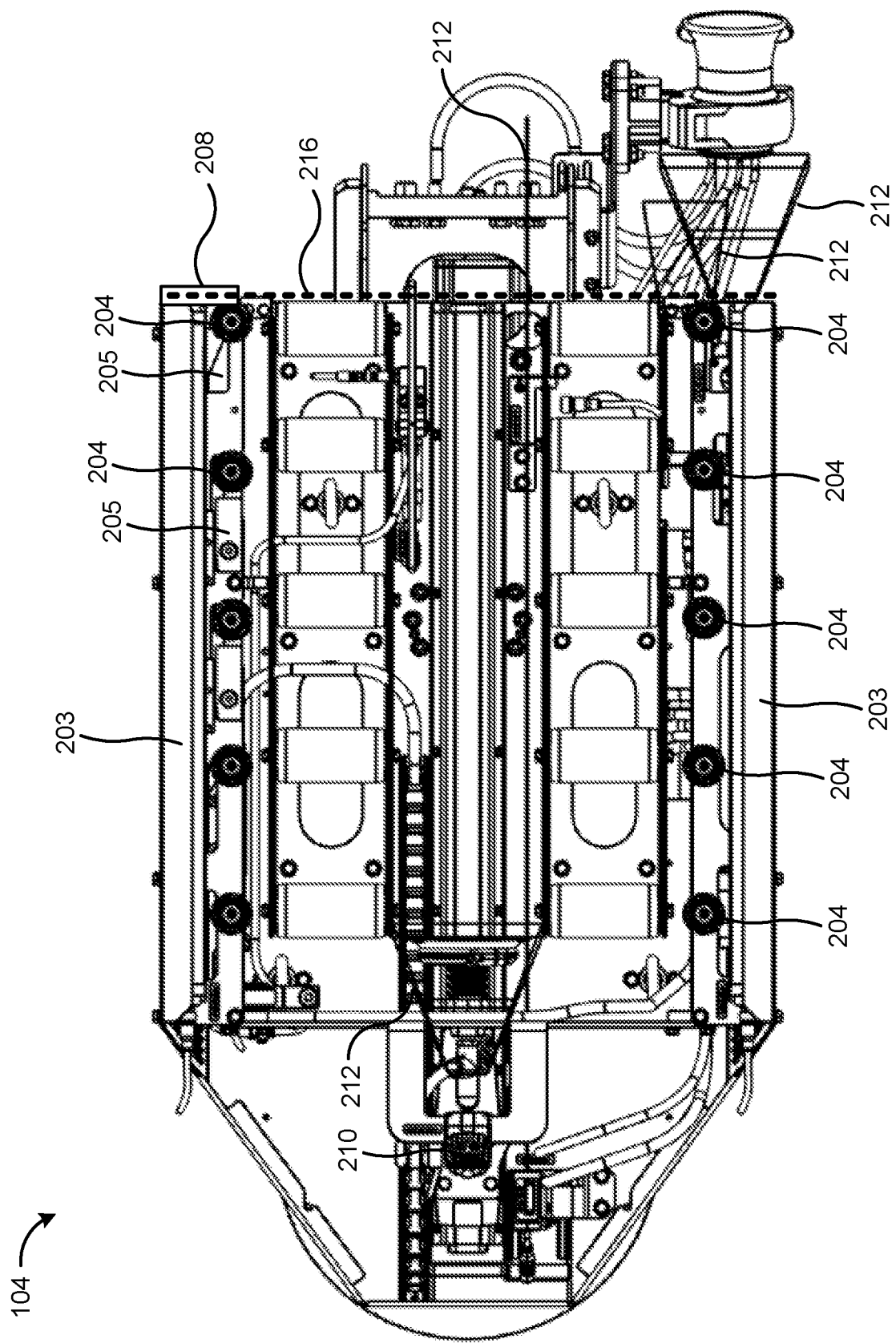

Turning to FIGS. 2 through 4, an example container transport 104 is shown. The container transport 104 can include sidewalls 120 at least partially surrounding a container receiving area 116. The sidewalls 120 can be or include material that can contain and/or constrain the containers 102 in the container receiving area 116. For example, the sidewalls 120 can be or include metal. However, the sidewalls 120 may be or include plastic, rubber, silicone, and/or any suitably rigid or semi-rigid material. FIG. 2 is shown with a container 102 positioned in the container receiving area 116. FIGS. 3 and 4 are top views where the container 102 has been removed for ease of viewing of other components of the container transport 104.

The container receiving area 116 can receive one or more containers 102. The containers 102 can be contained within the container receiving area 116, for example, while the container transport 104 is moving. For example, the containers 102 can be contained within the container receiving area 116 while the container transport 104 is being moved by the robotic manipulator 112. In various embodiments, the container receiving area 116 can include one or more container bays 202. The container bays 202 can include various components to aid in movement of the containers (e.g., into and/or out of the container bays 202). For example, the container bays 202 can include rollers 204. The rollers 204 can allow the containers 102 to more easily move into and/or out of the container bays 202. The rollers 204 can be or include passive rollers. However, the rollers 204 may be or include drive rollers, belts, conveyors, chains, a low-friction surface, and/or any suitable movement device to aid in movement of the containers 102.

As shown in FIGS. 3 and 4, rollers 204 can be positioned along an upper edge 203 of the container bays 202. The upper rollers 204 can be used to center the containers 102 in the container bays 202. The upper rollers 204 can include spring devices 205 (e.g., FIG. 4) that can be used to center the containers 102 in the container bays 202. For example, the spring devices 205 may resiliently bias the upper rollers 204 toward a centerline of the container transport 104 (e.g., can be used to push the containers 102 to the center of the container bays 202).

The containers 102 can be moved into and/or out of the container receiving area 116 (e.g., into and/or out of the container bays 202) using the manipulator 118. The manipulator 118 can engage with the container 102 and move the containers 102 into and/or out of the container receiving area 116. The manipulator 118 can remain engaged with the containers 102 during movement of the container transport 104. For example, the manipulator 118 can be engaged with the containers 102 while: the containers 102 are moved into the container receiving area 116, the container transport 104 moves the containers 102, and the containers 102 are moved out of the container receiving area 116. However, the manipulator 118 may engage and disengage the containers 102 multiple times. For example, the manipulator 118 can engage with the containers 102 to move the containers 102 into the container receiving area 116, disengage with the containers 102, and engage with the containers 102 to move the containers 102 out of the container receiving area 116.

In various embodiments, the manipulator 118 can include an end effector 206 (e.g., FIG. 3A) that can lift, push, and/or otherwise move the containers 102 onto and/or off of the container transport 104 (e.g., into and/or out of the container receiving area 116 and/or the container bays 202). The end effector 206 can be or include fingers, rails, a chute, soft robotic end effectors, vacuum end effectors, electro-adhesion end effectors, and/or mechanical or electromechanical end effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or Ferrofluids (e.g., fluids having suspended Ferro-magnetic particles capable of altering a size or shape of the fluid volume when subjected to a magnetic field). Vacuum end effectors may grasp objects using suction. Electro-adhesion end effectors can include an array of electrodes arranged along a flexible or rigid substrate capable of applying a charge (akin to static electricity) that can adhere an object to the substrate portions that are in contact with the object. Mechanical or electromechanical end effectors may include pinchers, claws, grippers, or other rigid components that may be actuated relative to one another for grasping an object. Other end effectors may also be utilized to facilitate additional grasping functions.

In some embodiments, the container transport 104 can include a retention device 208. The retention device 208 can aid in holding the containers 102 in the container receiving area 116 and/or the container bays 202. For example, the retention device 208 can aid in preventing the containers 102 from falling off of or out of the container transport 104 when the container transport 104 is moving (e.g., being moved by the robotic manipulator 112 and/or rotating).

The container transport 104 can be attached to the robotic manipulator 112 with the support 114. The support 114 can rotate the container transport 104. For example, the support 114 can rotate the container transport 104 between a first manipulation position (e.g., as shown in FIG. 3A) and a second manipulation position (e.g., as shown in FIG. 3B). The container transport 104 can be rotated past a storage position (e.g., as shown in FIG. 4). In the first and/or the second manipulation position, the container transport 104 can be in a position for movement of containers 102 into and/or out of the container transport 104. In the storage position, the container transport 104 can be in a position to prevent movement of containers 102 into and/or out of the container transport 104. In some embodiments, the containers 102 can be moved by the container transport 104 when the container transport 104 is in the storage position. Additionally or alternatively, the containers 102 can be moved by the container transport 104 when the container transport 104 is in the first or second manipulation position and/or when the container transport 104 is in any position between the manipulation and storage positions.

The robotic manipulator 112 and the support 114 can allow the container transport 104 to be moved along eight-axes. For example, the robotic manipulator 112 can move along six-axes and the rotation of the support 114 and actuation of the manipulator 118 can be the remaining two axes. In various embodiments, the support 114 can be or include an actuator and/or a motor to rotate the container transport 104. The actuator and/or the motor can be connected to a gearing system (e.g., a gear box). For example, the support 114 can be or include a servo motor connected to planetary gears. The actuator can be or include a rotary actuator and/or a torsional actuator. The motor can be or include a servo motor and/or an electric motor. In various embodiments, the support 114 can be or include a mechanical support. The mechanical support can support the container transport 104 during rotation (e.g., rotation by the motor and/or the actuator).

The container transport 104 can include various sensors 210. The sensors 210 can be used to detect various components of the container management system 100. The sensors 210 can include a field of view 212 (e.g., a detection area). The field of view 212 can include components (e.g., containers 102) outside of the container transport 104 and/or components positioned on the container transport 104. For example, a sensor 210 can have a field of view 212 of the container 102 positioned in the container bay 202.

The sensors 210 can include a distance sensor. The distance sensor can be used to detect a distance between the container transport 104 and a container 102 (e.g., a container 102 positioned in the container holder 106). The distance sensor can be used to determine a distance the manipulator 118 moves to move a container 102 into and/or out of the container holder 106. For example, the distance sensor can detect a distance to a sidewall of a container 102 positioned in the container holder 106. The manipulator 118 can then extend that distance to engage with the detected sidewall of the container 102. Additionally or alternatively, the distance sensor can be used to detect a distance to the back of a container location 108. The distance can then be used to determine a distance the manipulator 118 needs to extend to move a container 102 from the container transport 104 to the container location 108.

In various embodiments, the sensors 210 can be or include an optical scanner (e.g., a barcode scanner). The optical scanner can be used to detect data associated with the containers 102. For example, the optical scanner can be used to detect a fiducial (e.g., a barcode and/or a label) positioned on the containers 102. The fiducial can include information about the containers 102 and/or the items positioned in the containers 102. The fiducial can additionally or alternatively include instructions and/or location information on a location for the container 102.

In further embodiments, multiple optical scanners can be positioned on the container transport 104. For example, a first an optical scanner can be positioned to scan a container 102 positioned outside of the container transport 104 (e.g., positioned in the container holder 106) and a second optical scanner can be positioned to scan a container 102 positioned on the container transport 104 (e.g., in the container bay 202).

The sensors 210 can additionally or alternatively include a photo eye. The photo eye can be used to detect whether a container location 108 already has a container 102 or other obstruction. For example, the photo eye can be used to determine whether a container location 108 that is supposed to be empty contains a container 102 or other obstruction.

In some embodiments, the sensors 210 can include a Lidar sensor. The Lidar sensor can be used to orient the container transport 104 relative to the container holder 106. For example, the Lidar sensor can detect a portion (e.g., a corner) of the container holder 106 and use that to position the container transport 104 for loading and/or unloading of a container 102.

In further embodiments, the sensors 210 can be or include a light curtain. The light curtain can be used to detect items that may be positioned outside of the containers 102. For example, the light curtain can be positioned above the containers 102 to detect items that may be positioned above or projecting across the top of the containers.

Figure 5A:
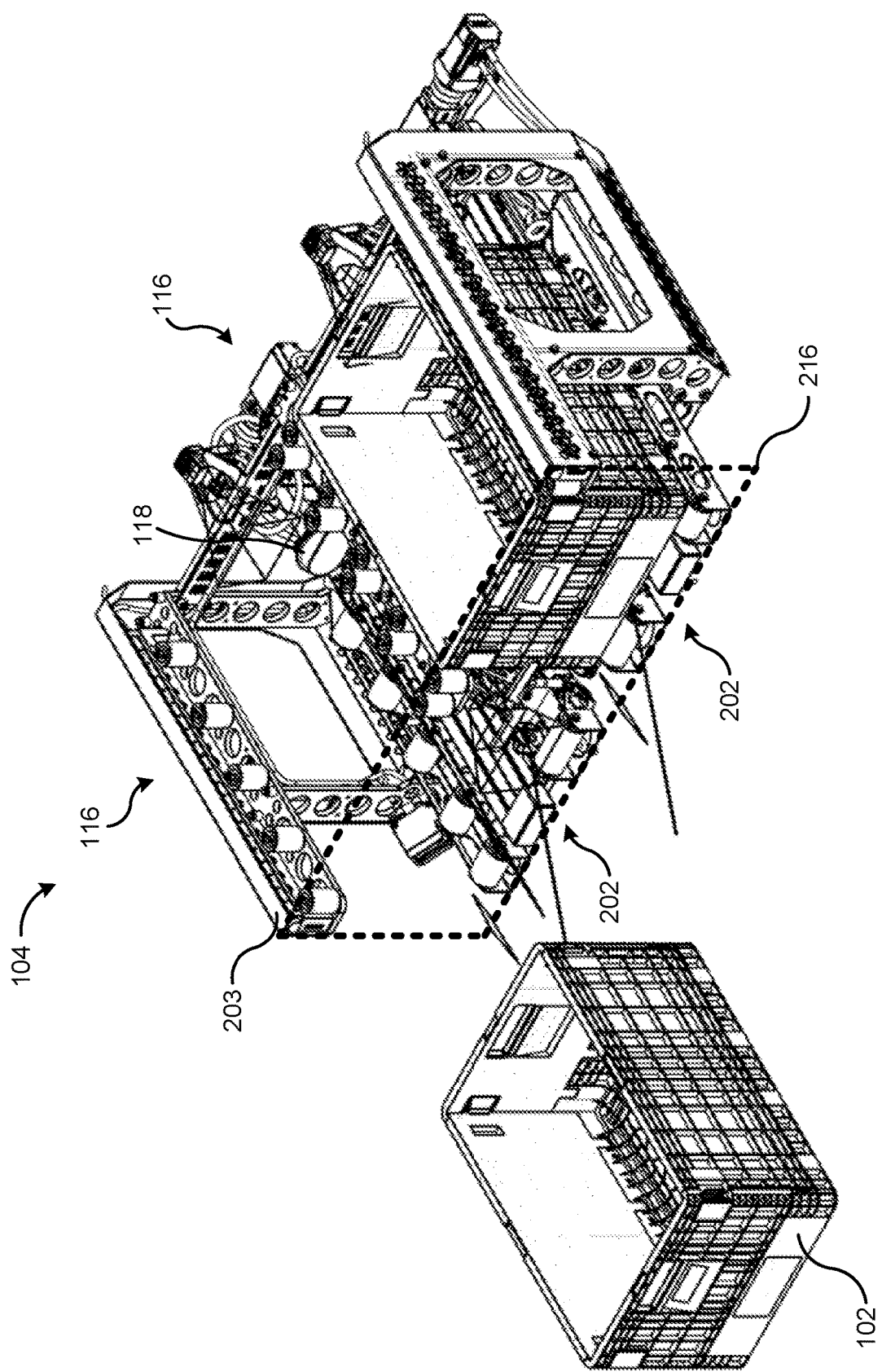
FIGS. 5A and 5B illustrate another example container manipulator for use with the container management system of FIG. 1, according to various embodiments.
Figure 5B:
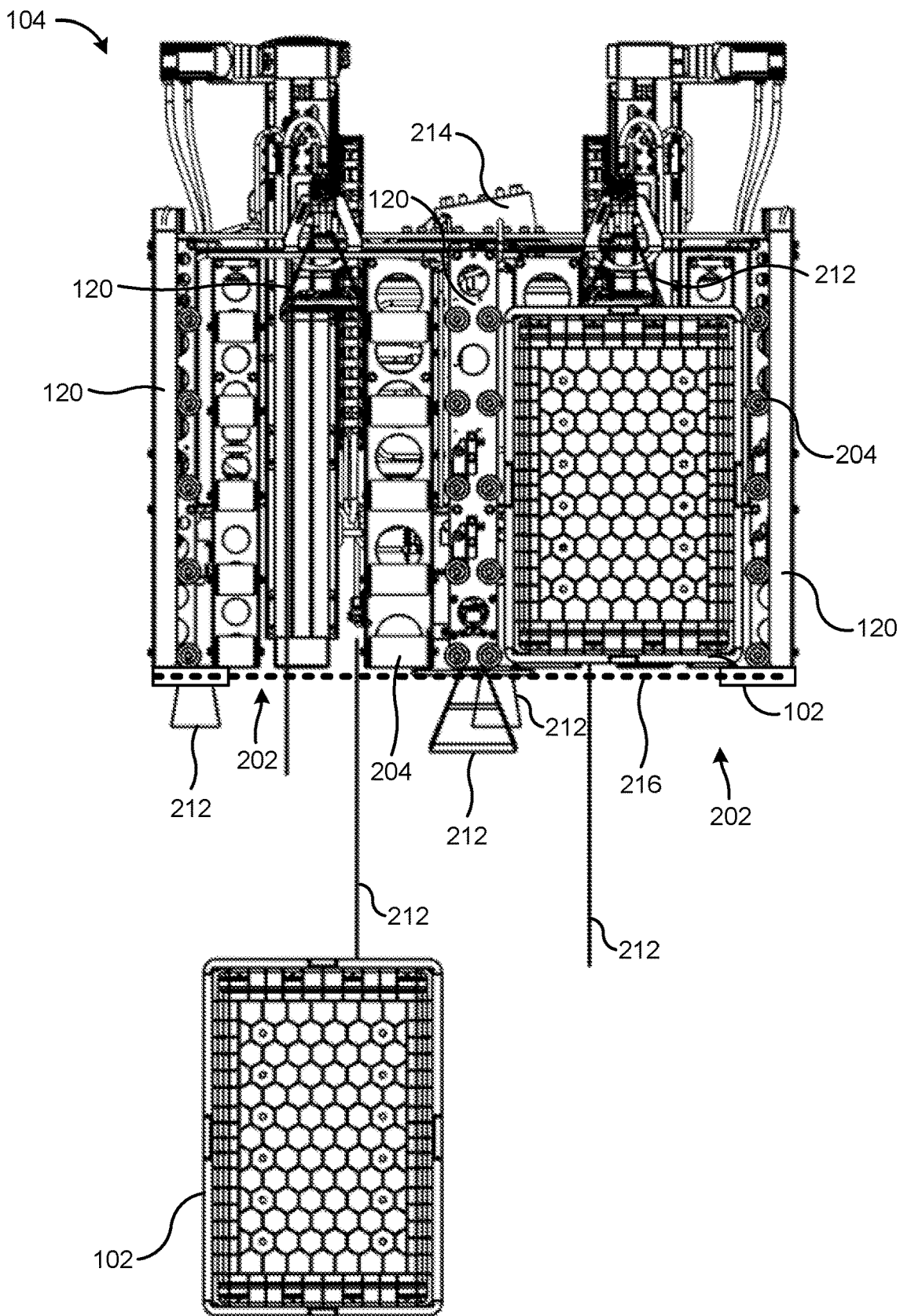

Turning to FIGS. 5A and 5B, another example container transport 104 can include a container receiving area 116 with multiple container bays 202. The container bays 202 can allow for the positioning of multiple containers 102 in the container receiving area 116. Each of the container bays 202 can receive a single container 102. However, the container bays 202 may each receive multiple containers 102. Each of the container bays 202 may include a manipulator 118. For example, each of the container bays 202 may include a manipulator 118 to move containers 102 into and out of the container bays 202. However, a single manipulator 118 may be used to move the containers 102 into and/or out of the multiple container bays 202. The container bays 202 can be separated by one or more sidewalls 120. For example, a center sidewall 120 can be positioned between two container bays 202.

In various embodiments, the container transport 104 can include a mount 214. The mount 214 can be used to couple the container transport 104 with the robotic manipulator 112. The mount 214 can be angled relative to the container transport 104. The mount 214 can prevent the container transport 104 to be completely aligned with the robotic manipulator 112. In further embodiments, the mount 214 can be rotated to change the angle at which the container transport 104 is mounted relative to the robotic manipulator 112.

Figure 6:
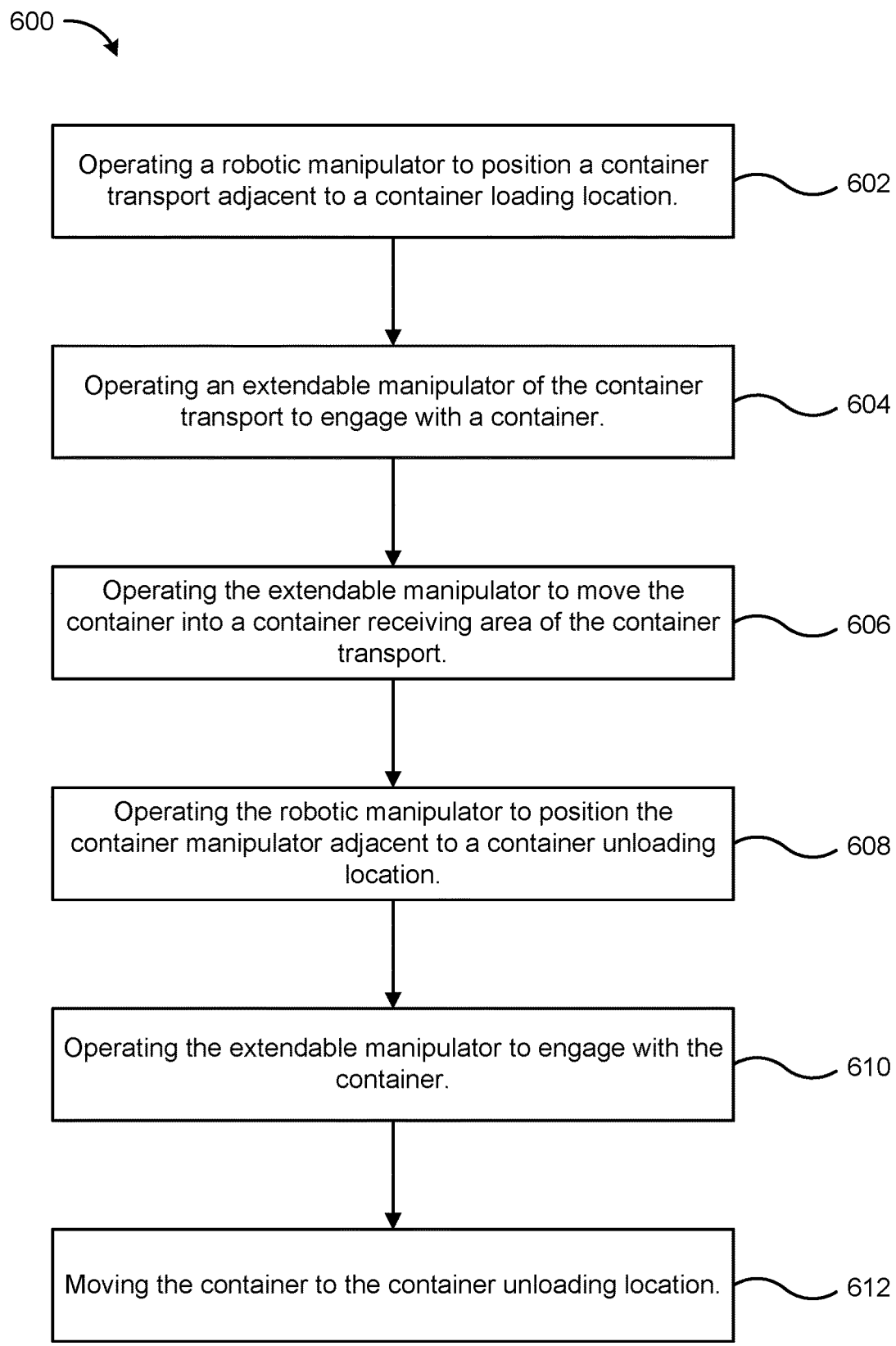
FIG. 6 is a flowchart illustrating a process for moving containers using the container management system of FIG. 1, according to various embodiments.

Turning to FIG. 6 a flowchart illustrating a process 600 for moving containers 102 using the container management system 100 of FIG. 1 is shown. Various blocks of the process 600 are described by referencing the components shown in FIGS. 7 through 24, however, additional or alternative components may be used with the process. FIGS. 7 through 24 illustrate the example process 600 using particular embodiments of the example container transport 104. For example, the example process 600 may utilize the example container transports 104 shown in FIGS. 1 through 5

The process 600 at block 602 can include operating a robotic manipulator (e.g., robotic manipulator 112) to position a container transport (e.g., container transport 104) adjacent to a container loading location. In various embodiments, the container loading location can be or include the container holder 106 with container locations 108. The robotic manipulator 112 can move the container transport 104 from a storage and/or starting position. FIGS. 7 and 16 show the container transport 104 in the storage and/or starting position. In the storage and/or starting position, the container transport 104 can use sensors (e.g., Lidar sensors) to determine a position of the container holder 106 relative to the container transport 104.

The robotic manipulator 112 can position the container transport 104 next to the container holder 106. As shown in FIGS. 8 and 17, the container transport 104 can be positioned such that a container receiving area 116 is aligned with a container 102 (e.g., a container 102 positioned in the container holder 106 and/or a container 102 positioned on the conveyor 122). Positioning the container transport 104 can additionally or alternatively include rotating the container transport 104 (e.g., from the storage position to the carrying position). Examples can include rotating from the position of FIG. 7 to the position of FIG. 8 (e.g., as shown by directional arrow 702), or rotating from the position of FIG. 16 to the position of FIG. 17 (e.g., as shown by directional arrow 704). In various embodiments, positioning the container transport 104 can include using sensors 210 to detect data associated with the containers 102 and/or the container holder 106. For example, the sensors 210 can detect a portion of the container holder 106 that can be used to align the container receiving area 116 with the container 102.

The process 600 at block 604 can include operating a manipulator (e.g., manipulator 118) of the container transport 104 to engage with a container 102. Sensors 210 can be used to determine a distance the manipulator 118 extends to engage with the container 102. As shown in FIGS. 9 and 18 (e.g., by arrows 706 and 708 respectively), the manipulator 118 can extend outside of the container receiving area 116 to engage with the container 102. For example, to engage with the container 102, the manipulator 118 can extend into the container holder 106 (e.g., as shown in FIG. 9) or over the conveyor 122 (e.g., as shown in FIG. 18).

Figure 19:
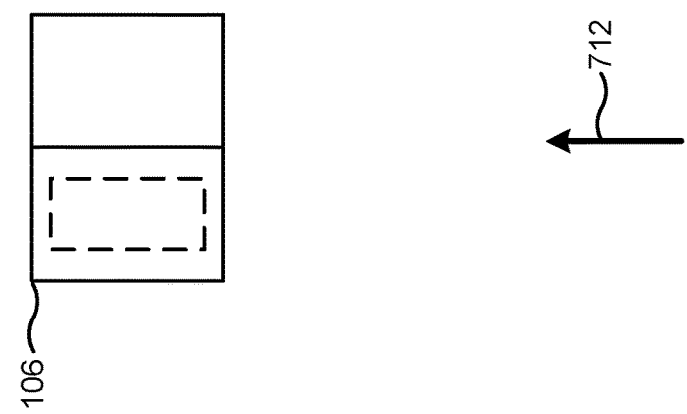

The process 600 at block 606 can include operating the manipulator 118 to move the container 102 into the container receiving area 116 of the container transport 104 (e.g., as shown in FIGS. 10 and 19, such as by arrows 710 and 712 respectively). The manipulator 118 can move the container 102 into the container receiving area 116.

Figure 21:
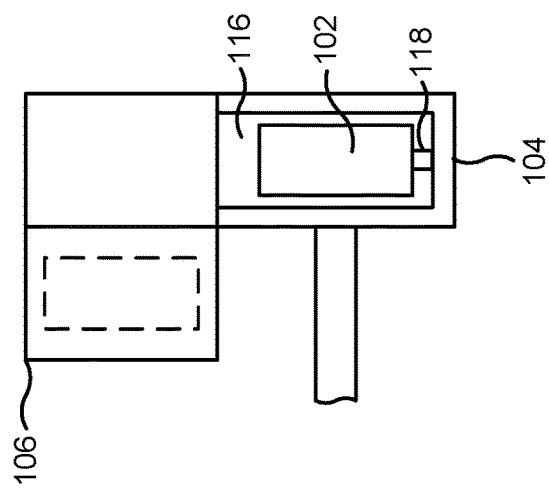
Figure 20:
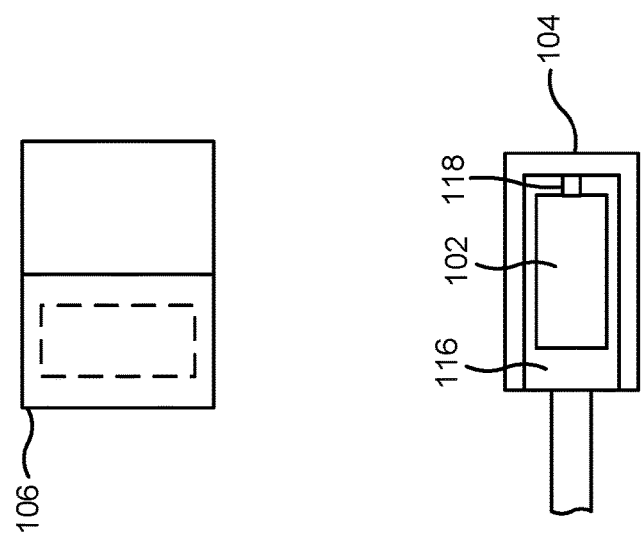

The process 600 at block 608 can include operating the robotic manipulator 112 to position the container transport 104 adjacent to a container unloading location (e.g., as shown in FIGS. 12 and 21). For example, the container transport 104 can be positioned adjacent to the conveyor 122 and/or the container holder 106. As shown in FIGS. 11 and 20, positioning the container transport 104 adjacent to the container unloading location (e.g., conveyor 122 and/or container holder 106) can include rotating (e.g., as shown by directional arrow 714 in FIG. 11 and directional arrow 716 in FIG. 20) the container transport 104 (such as among one or more of the positions in FIGS. 10 and 11 to the position in FIG. 12, or among one or more of the positions in FIGS. 19 and 20 and to the position in FIG. 21). The container transport 104 can be positioned with the container receiving area 116 aligned with the container unloading location. For example, the container receiving area 116 can be aligned with the container unloading location to unload the container 102.

In some embodiments, the process 600 at block 610 can include operating the manipulator 118 to engage with the container 102. As shown in FIGS. 13 and 22, such as by arrows 718 and 720 respectively, the manipulator 118 can engage with the container 102 when the container is positioned in the container receiving area 116. For example, the manipulator 118 can disengage with the container 102 when the container 102 is positioned in the container receiving area 116 and/or when the container 102 is moved between the container loading location and the container unloading location. The manipulator 118 can then engage with the container 102, for example, when the container transport 104 is positioned adjacent to the container unloading location and/or the container receiving area 116 is aligned with the container unloading location. However, in various embodiments, the manipulator 118 can remain engaged with the container 102 when the container is positioned in the container receiving area 116 (e.g., as shown in FIGS. 11 and 12 and 20 and 21). For example, the container manipulator 118 can remain engaged with the container 102 when the container 102 is moved from the container loading location to the container unloading location.

The process 600 at block 612 can include moving the container 102 to the container unloading location. As shown by arrows 718 in FIGS. 14, 15 and arrows 720 in FIGS. 23 and 24, the manipulator 118 can move the container 102 off of the container transport 104. The manipulator 118 can extend beyond the container receiving area 116 to unload the container 102 (e.g., as shown in FIGS. 15 and 24). For example, the manipulator 118 can extend over the conveyor 122 (e.g., as shown in FIG. 15) or into the container holder 106 (e.g., as shown in FIG. 24).

Figure 25:
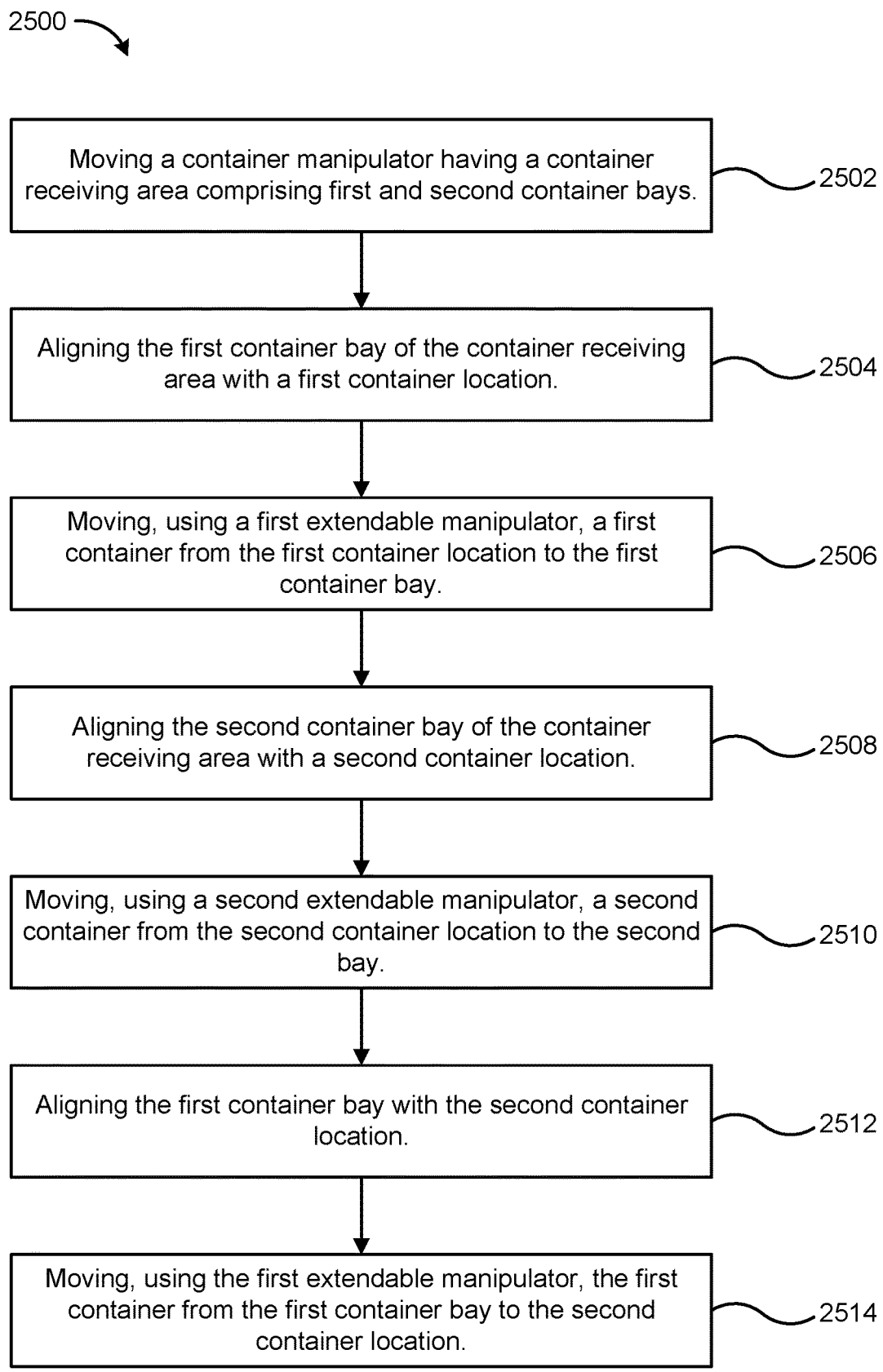
FIG. 25 is a flowchart illustrating another process for moving containers using the container management system of FIG. 1, according to various embodiments.

Turning to FIG. 25 a flowchart illustrating a process 2500 for moving containers 102 using the container management system 100 of FIG. 1 is shown. Various blocks of the process 2500 are described by referencing the components shown in FIGS. 26 through 43, however, additional or alternative components may be used with the process. FIGS. 26 through 43 illustrate the example process 2500 using particular embodiments of the example container transport 104. For example, the example container transport 104 of FIGS. 1 through 5

Figure 26:
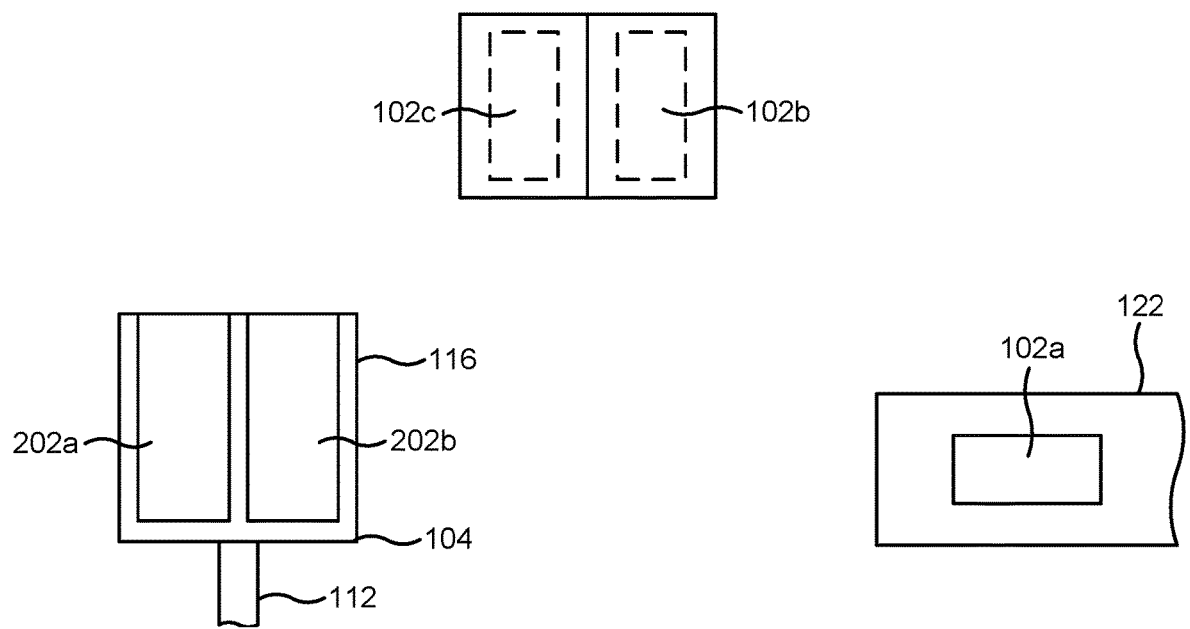
Figure 36:
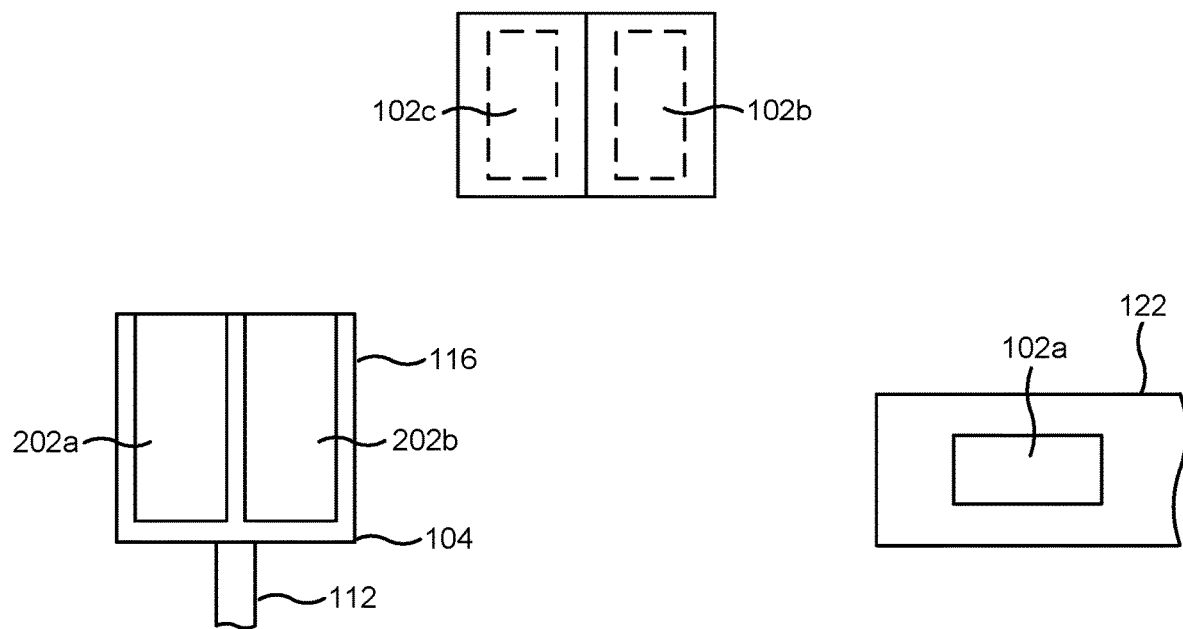

The process 2500 at block 2502 can include moving a container transport (e.g., container transport 104) having a container receiving area (e.g., container receiving area 116) comprising first and second container bays (e.g., container bays 202a and 202b). The container transport 104 can be moved by a robotic manipulator (e.g., robotic manipulator 112). In various embodiments, prior to moving, the robotic manipulator 112 and/or the container transport 104 can be positioned at a storage and/or a staging location (e.g., as shown in FIGS. 26 and 36). The container transport 104 can be moved to a position adjacent to a container loading location. For example, the container transport 104 can be moved to a position adjacent to a container holder 106 and/or a conveyor 122.

Figure 27:
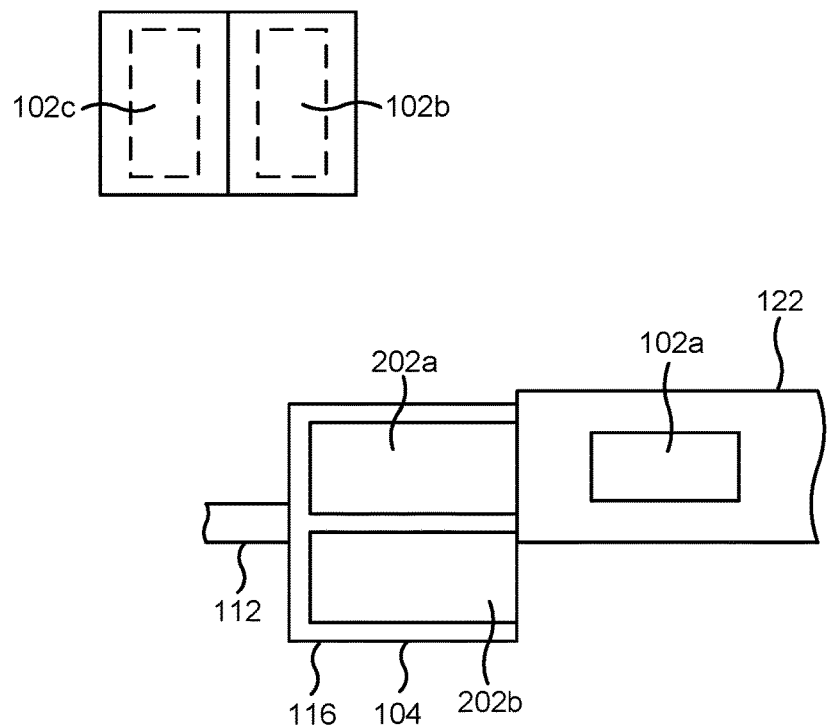
Figure 37:
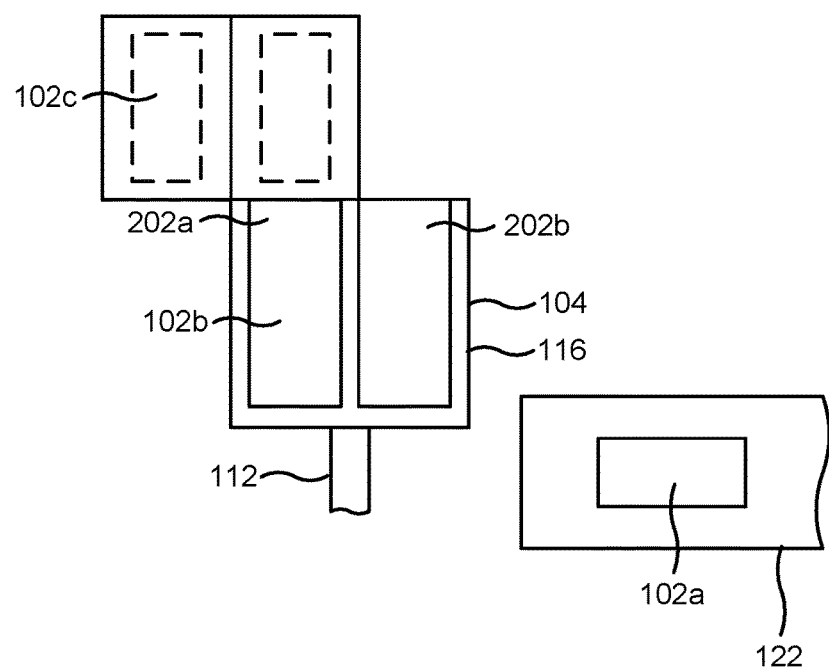

The process 2500 at block 2504 can include aligning the first container bay 202a of the container receiving area 116 with a first container location. The first container location can be the conveyor 122 (e.g., as shown in FIG. 27) and/or can be the container holder 106 (e.g., as shown in FIG. 37). The first container bay 202a can be aligned with the first container location to allow a container 102 to be moved from the first container location to the first container bay 202a (e.g., container 102a as shown in FIG. 27 and container 102b as shown in FIG. 37). In various embodiments, sensors 210 can be used to align the first container bay 202a with the first container location. For example, a Lidar sensor can be used to determine where the container transport 104 is located relative to the first container location. Movement instructions can then be generated based on the relative location of the container transport 104.

Figure 38:
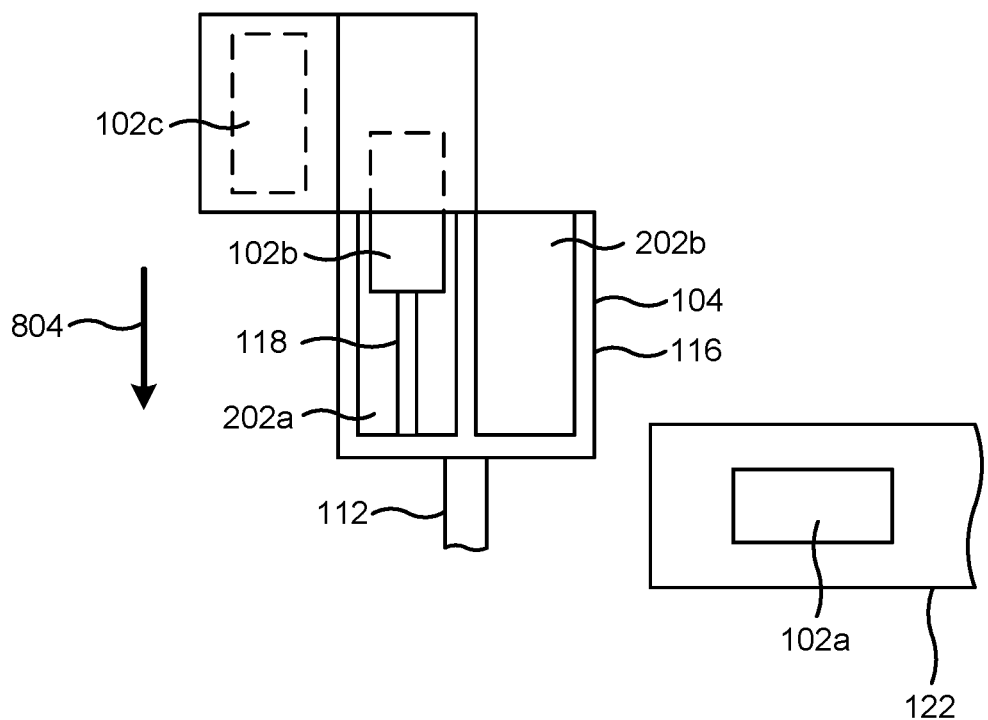

The process 2500 at block 2506 can include moving, using a manipulator (e.g., manipulator 118), a first container 102 (e.g., container 102a as shown in FIG. 28 and container 102b as shown in FIG. 38) from the first container location to the first container bay 202a (e.g., in direction 802 in FIG. 28 and direction 804 in FIG. 38). The manipulator 118 can extend outside of the first container bay 202a to engage with the container 102. The manipulator 118 can engage with the container and pull the container 102 into the first container bay 202a (e.g., as shown in FIGS. 28 and 38). The manipulator 118 can retain the container 102 in the first container bay 202a, for example, to prevent the container 102 from falling out of the first container bay 202a during movement of the container transport. Additionally or alternatively, the retention device 208 can be used to retain the container 102 in the first container bay 202a.

Figure 39:
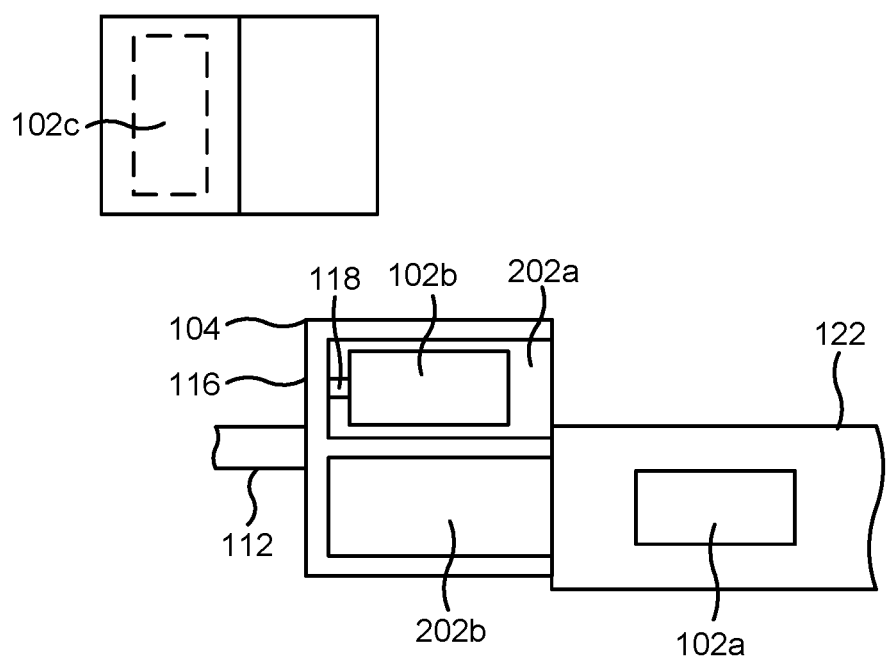

The process 2500 at block 2508 can include aligning the second container bay 202b of the container receiving area 116 with a second container location (e.g., container holder 106 as shown in FIG. 29 and conveyor 122 as shown in FIG. 39). The second container bay 202b can be aligned with the second container location using the robotic manipulator 112. For example, the robotic manipulator 112 can position the container transport 104 adjacent to the second container location and align the second container bay 202b with the second container location. In various embodiments, the second container bay 202b can be aligned using one or more sensors 210.

Figure 30:
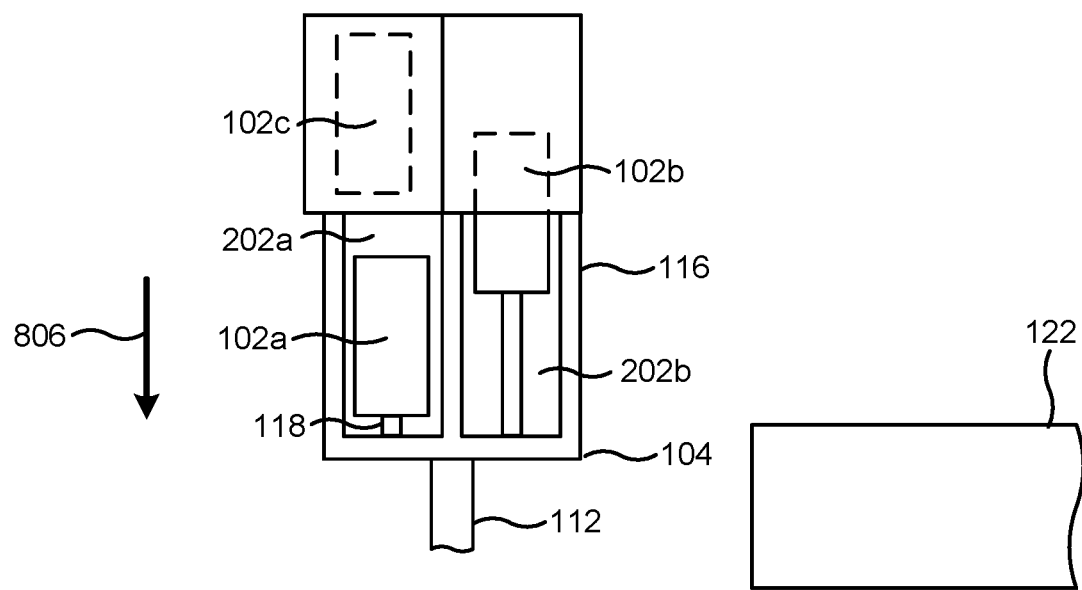

The process 2500 at block 2510 can include moving, using a manipulator 118, a second container 102 (e.g., container 102b as shown in FIG. 30 and container 102a as shown in FIG. 40) from the second container location to the second container bay 202b (e.g., as in direction 806 as shown in FIG. 30 and direction 808 as shown in FIG. 40). In various embodiments, a different manipulator 118 can be used to move the second container 102 into the second container bay 202b than was used to move the first container 102 into the first container bay 202a. However, the same manipulator 118 can be used to move the first and second containers 102. The manipulator 118 can extend outside of the container bay 202 and/or the container receiving area 116 to engage with the second container 102 in the second container location. The manipulator 118 can pull the second container 102 into the second container bay 202b until the second container 102 is fully positioned within the second container bay 202a and/or the container receiving area 116.

Figure 31:
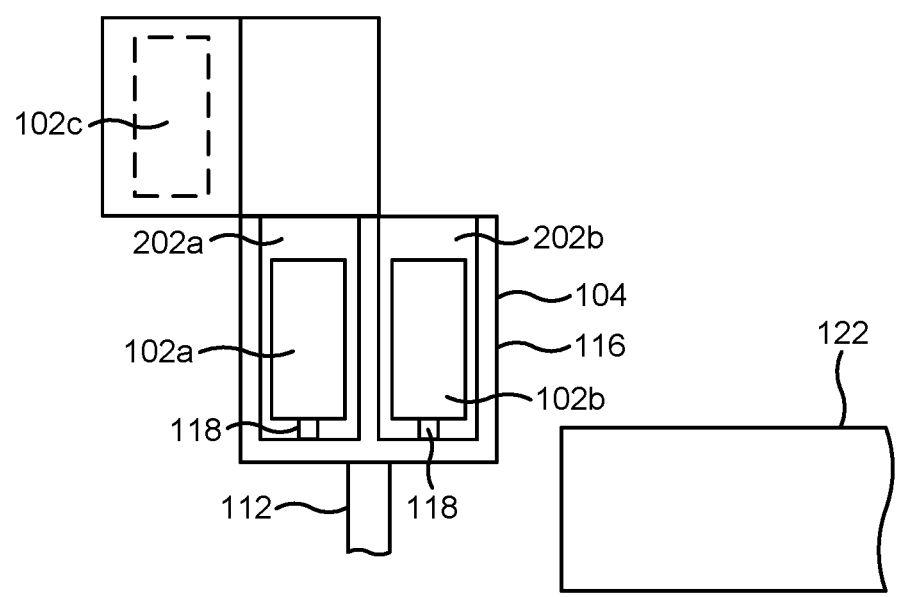

The process 2500 at block 2512 can include aligning the first container bay 202a with the second container location (e.g., the container holder 106 as shown in FIG. 31 and/or the conveyor 122 of FIG. 41). The first container bay 202a can be aligned with the second container location by moving the container transport 104 with the robotic manipulator 112. The first container bay 202a can additionally or alternatively be aligned with the second container location using one or more sensors 210.

Figure 32:
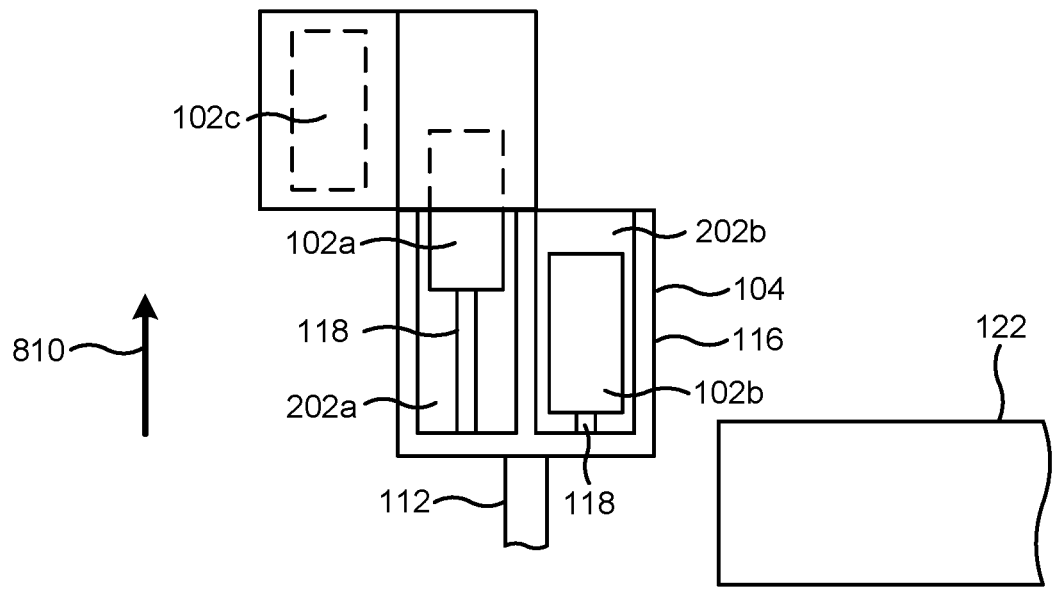
Figure 42:
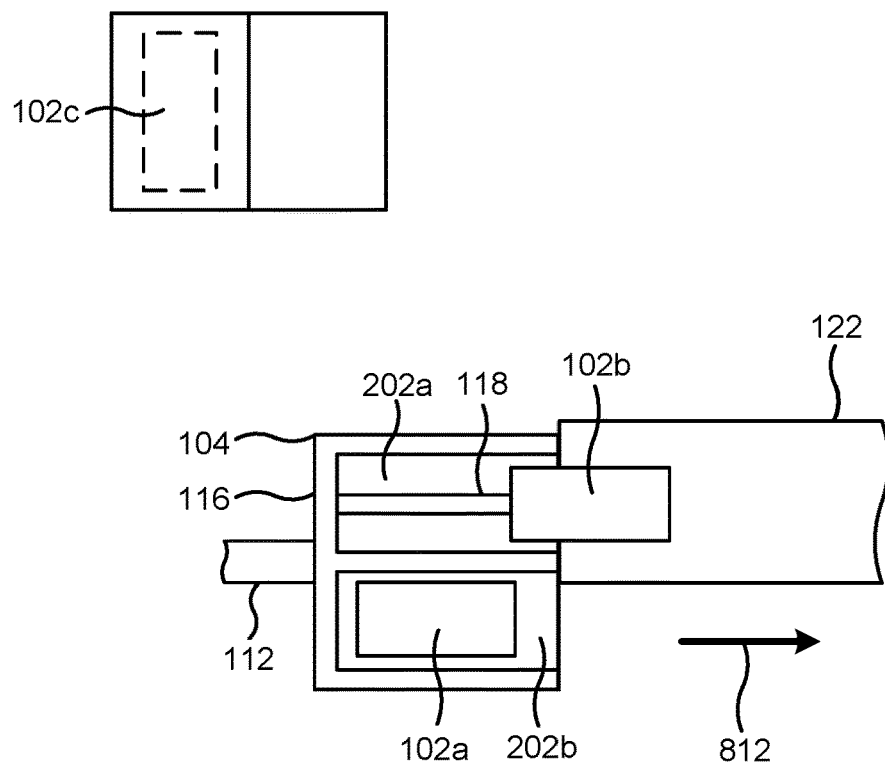

The process 2500 at block 2514 can include moving, using the manipulator 118, the first container 102 from the first container bay 202a to the second container location (e.g., to the container holder 106 as shown in FIG. 32 and/or to the conveyor 122 as shown in FIG. 42). The manipulator 118 can move the first container 102, for example, until the manipulator 118 is completely outside of the first container bay 202a and/or the container receiving area 116. The manipulator 118 can move the first container 102 in direction 812 as shown in FIG. 32 and direction 814 as shown in FIG. 42).

Figure 33:
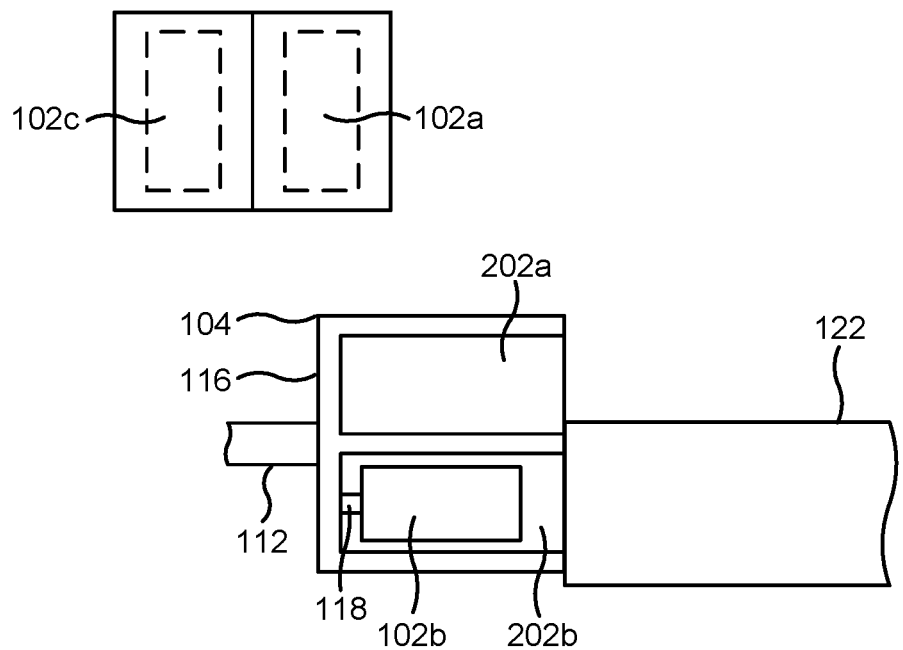
Figure 34:
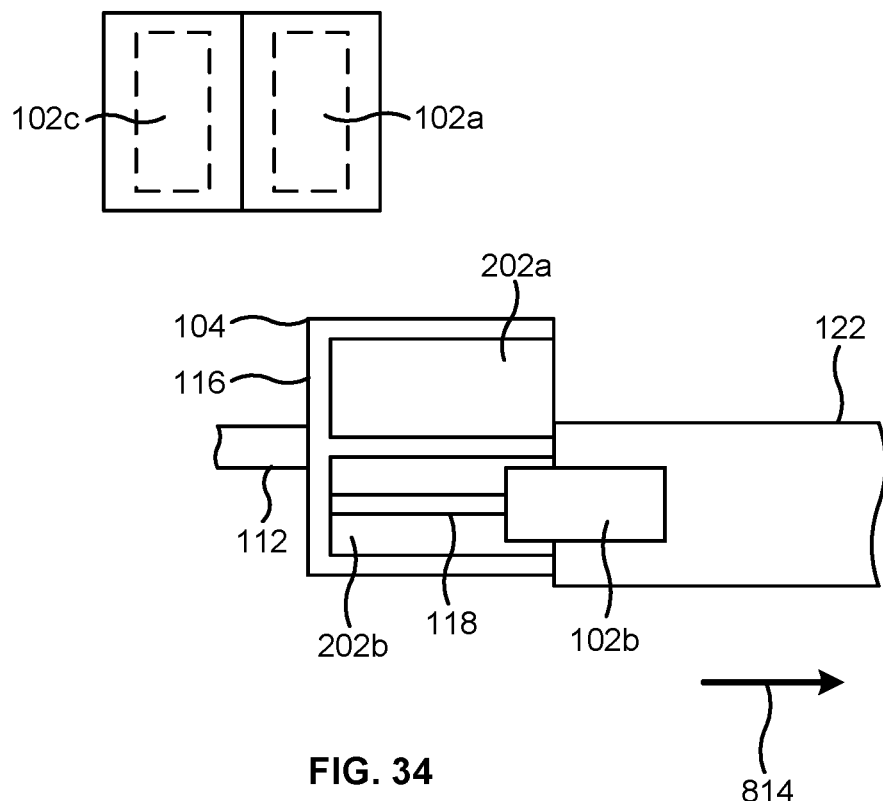
Figure 35:
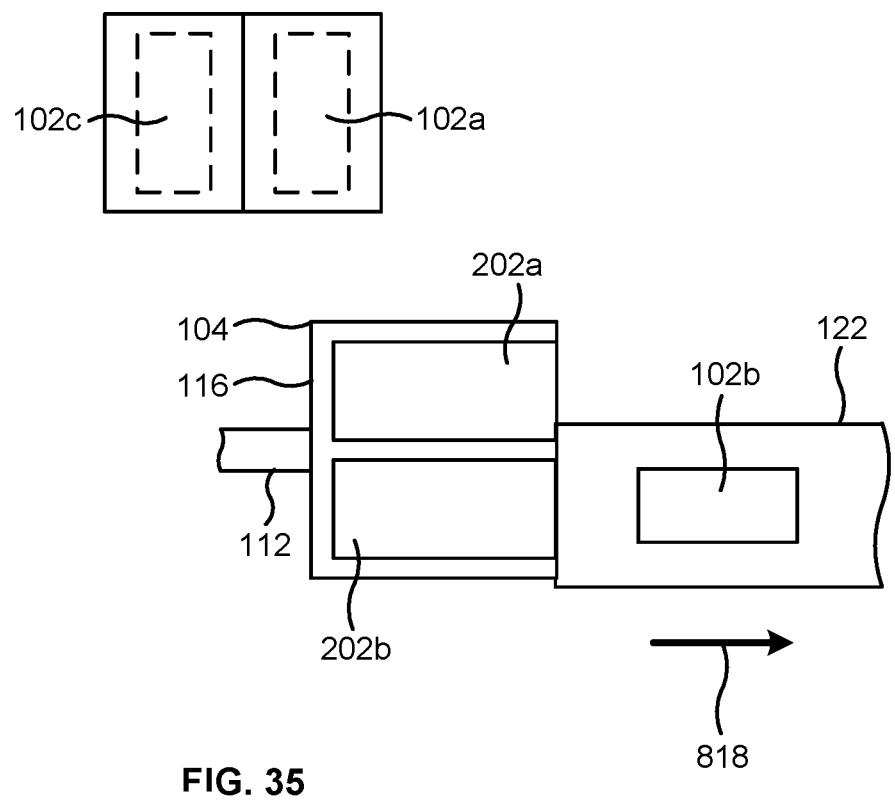
Figure 43:
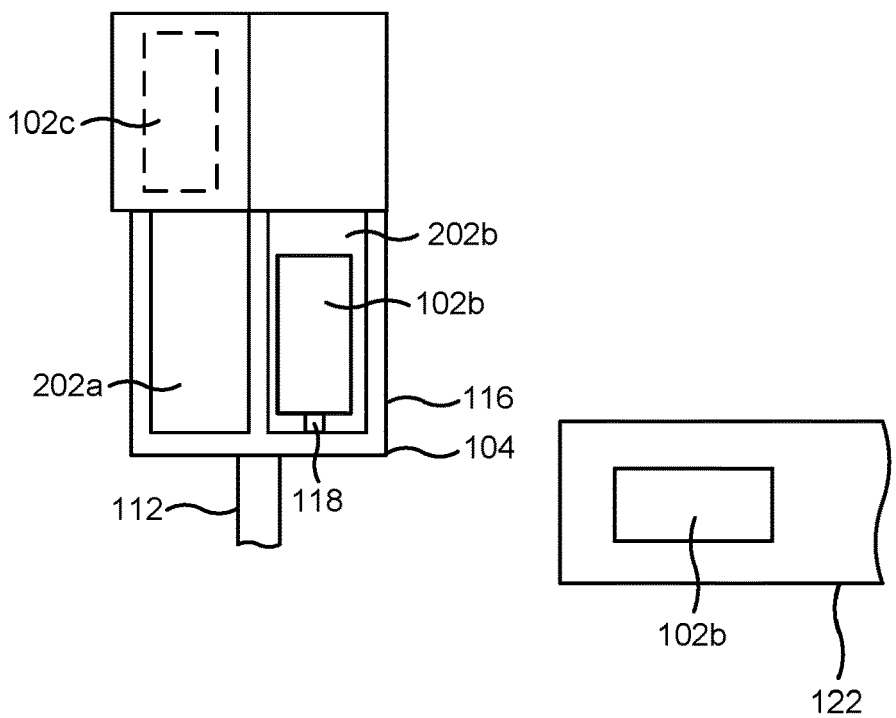
Figure 44:
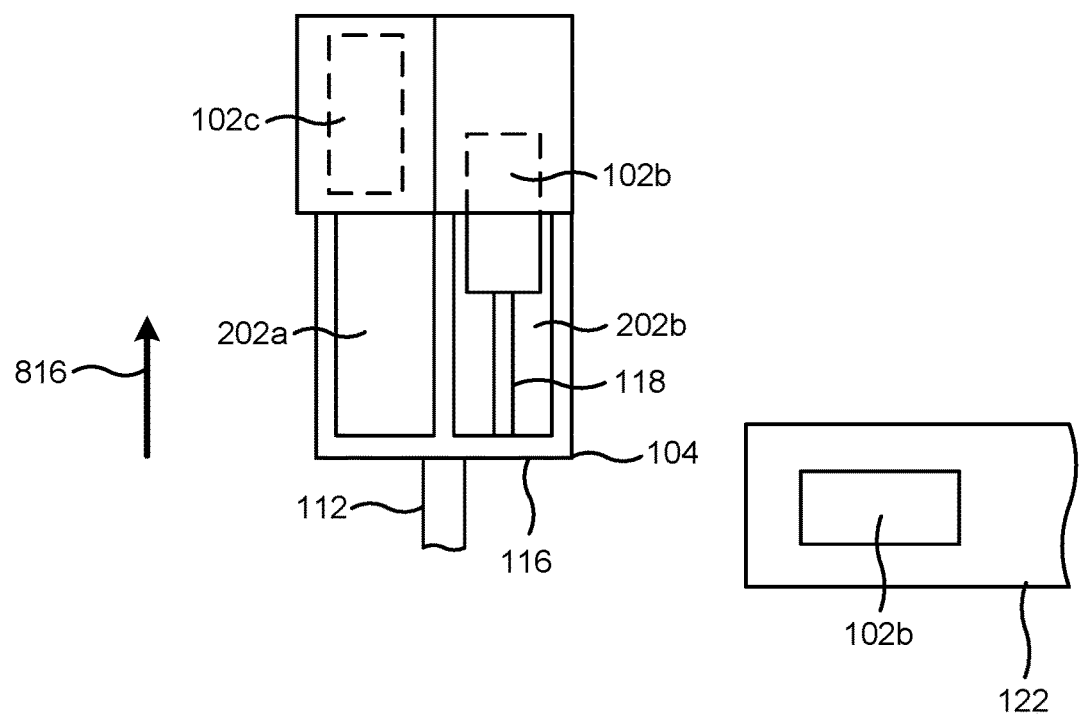
Figure 45:
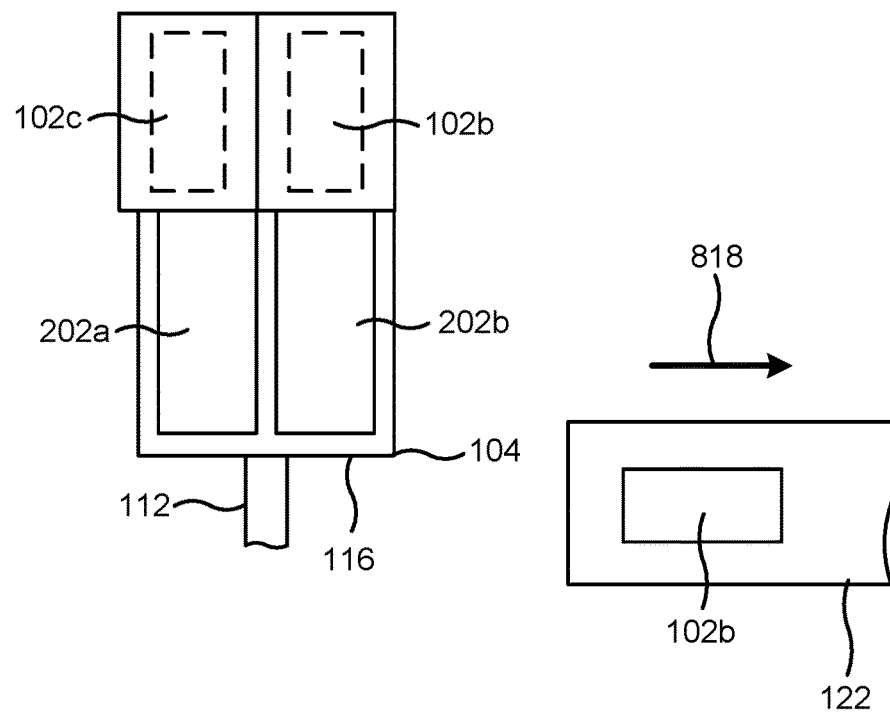

In various embodiments, the process 2500 can include aligning the second container bay 202b with the first container location (e.g., with the conveyor as shown in FIG. 33 and/or the container holder as shown in FIG. 43). The manipulator 118 can then move container 102 from the second container bay 202b into the first container location (e.g., as shown in FIGS. 34 and 44). The container 102 can be moved into the first container location in direction 814 as shown in FIG. 34 and direction 816 as shown in FIG. 44.

In various embodiments, the process 2500 can include moving the first and/or the second containers 102. For example, the conveyor 122 and/or the container holder 106 can be used to move the container 102, for example, around the warehouse environment. For example, as shown in FIGS. and 45, the conveyor 122 can move the container 102 in direction 818.

Figure 46:
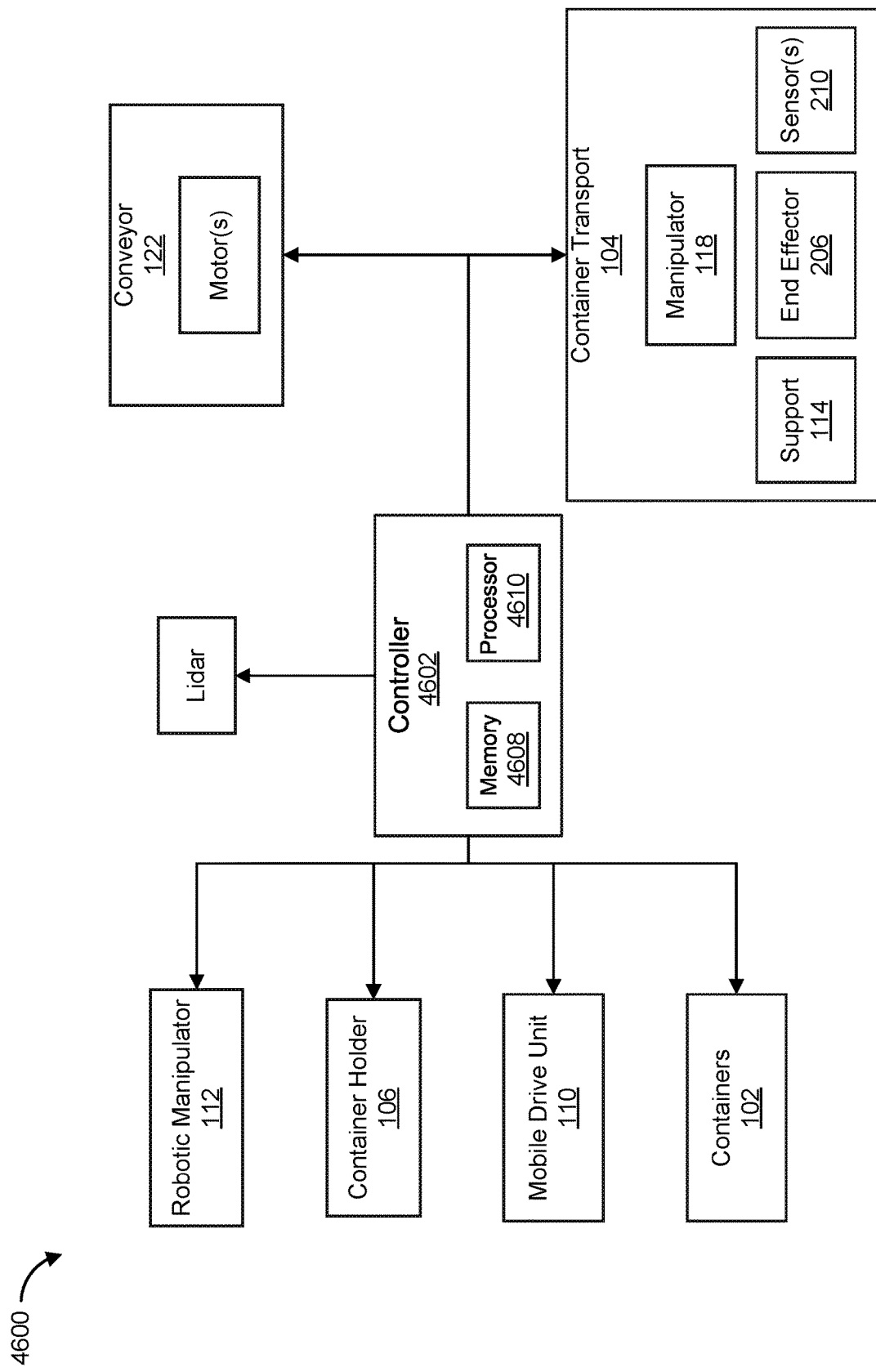
FIG. 46 is a simplified schematic diagram illustrating examples of control aspects that may be utilized in certain embodiments of the container management system of FIG. 1.

Turning to FIG. 46, a simplified schematic diagram 4600 illustrating examples of control aspects that may be utilized in certain embodiments of the container management system 100 of FIG. 1 is shown. A controller 4602 can communicate information and/or instructions associated with the container management system 100. The controller 4602 can be in communication with the robotic manipulator 112, the container transport 104, the manipulator 118, the support 114, the end effector 206, the sensors 210, the conveyor 122, the Lidar system components, the container holder 106, the mobile drive unit 110, the containers 102, and/or respective components associated with such elements, such as graphically included within each element in FIG. 46. The controller 4602 can communicate via a wired or wireless connection (e.g., Bluetooth). The controller 4602 can include memory 4608 and a processor 4610. The memory 4608 and the processor 4610 can be included in a single structure. However, the memory 4608 and processor 4610 may be part of a system of multiple interconnected devices.

The memory 4608 can include any type of memory device that retains stored information when powered off. The memory 4608 can be or include electrically erasable and programmable read-only memory ("EEPROM"), flash memory, or any other type of non-volatile memory. In some examples, at least part of the memory 4608 can include a medium from which the processor 4610 can read instructions. A non-transitory computer-readable medium can include electronic, optical, magnetic, or other storage devices capable of providing the processor 4610 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The processor 4610 can execute instructions stored in the memory 4608 to perform operations, for example, determining an item status based on item data. The processor 4610 can include one processing device or multiple processing devices. Non-limiting examples of the processor 4610 include a Field-Programmable Gate Array ("FPGA"), an application-specific integrated circuit ("ASIC"), a microprocessor, etc.

The controller 4602 can be in communication with one or more sensors 210 positioned on or otherwise associated with the container transport 104. The sensors 210 can be positioned to measure data associated with the containers 102. For example, the sensors 2306 can detect a label positioned on a container 102. Additionally or alternatively, the sensors 210 can detect a position of the containers 102 on the container transport 104, on the container holder 106, on the conveyor 122, and/or on other elements of the container management system 100. The sensors 210 can include an optical sensor, a scanner, a weight sensor, a camera, a Lidar system, an optical camera, and/or any suitable component for obtaining data associated with the container 102 and/or the container transport 104.

In various embodiments, the sensors 210 can additionally or alternatively measure data associated with any and/or all of the components of the container management system 100. For example, the sensors 210 can measure data associated with the robotic manipulator, the container holder 106, the mobile drive unit 110, and/or the conveyor 122.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A container management system, comprising:
   a robotic manipulator having an engagement area at a distal end; and
   a container transport coupled with the engagement area of the robotic manipulator, the container transport rotatable relative to the robotic manipulator between first and second manipulation positions, the container transport comprising:
   sidewalls defining a container receiving area;
   rollers positioned within the container receiving area and configured to support a container positioned in the container receiving area, the container configured to receive one or more inventory items; and
   a container manipulator configured to move the containers into and out of the container receiving area and retain the containers in the container receiving area.

2. The container management system of claim 1, wherein the container transport further comprises a first sensor configured to detect data associated with the container when the container is positioned in the container receiving area.

3. The container management system of claim 2, wherein the container transport further comprises a second sensor configured to detect a portion of items extending outside of the container.

4. The container management system of claim 3, wherein the container transport further comprises a third sensor configured to, when the container is positioned outside of the container receiving area, detect a distance between the container and the container receiving area.

5. The container management system of claim 4, wherein the first sensor, the second sensor, or the third sensor comprises one or more of an optical sensor, a light curtain, or an infrared sensor.

6. The container management system of claim 1, wherein the first and second manipulation positions are separated by 180 degrees.

7. A container transport, comprising:
   sidewalls defining a container receiving area, the container receiving area configured to receive a container comprising one or more inventory items;
   a support coupleable with a robotic manipulator and attached with and supporting the sidewalls, the support configured to rotate the container receiving area between first and second manipulation positions when a container is positioned in the container receiving area; and
   a container manipulator attached with and supported by the support, the container manipulator configured to engage with the container and move the container into and out of the container receiving area, the container manipulator engaged with the container during rotation of the container receiving area.

8. The container transport of claim 7, further comprising a container retention device configured to retain the container in the container receiving area during movement of the container transport.

9. The container transport of claim 7, wherein the container manipulator comprises an end effector configured to engage with the container.

10. The container transport of claim 7, further comprising rollers configured to support the container when the container is positioned in the container receiving area.

11. The container transport of claim 7, further comprising a light curtain positioned to detect a portion of the one or more inventory items extending outside of the container.

12. The container transport of claim 7, further comprising an optical sensor configured to detect a distance between the container and the container manipulator when the container is positioned in a container loading location.

13. The container transport of claim 7, further comprising an optical sensor configured to detect data associated with the container when the container is positioned in the container receiving area.

14. The container transport of claim 7, wherein the container manipulator is configured to extend beyond the container receiving area to engage with the container.

15. A container management system, comprising:
   a robotic manipulator;
   a container transport coupled with the robotic manipulator, the container transport comprising:
   a container receiving area; and
   a container manipulator configured to move containers into and out of the container receiving area; and
   a module operable to:
   operate the robotic manipulator to position the container transport adjacent to a container loading location;
   operate the container manipulator to engage with a container and move the container from the container loading location and into the container receiving area;
   with the container manipulator engaged with the container, operate the robotic manipulator to position the container transport adjacent to a container unloading location; and
   with the container manipulator engaged with the container, operate the container manipulator to move the container to the container unloading location.

16. The container management system of claim 15, wherein operating the robotic manipulator to position the container transport adjacent to the container unloading location comprises rotating the container transport.

17. The container management system of claim 15, wherein operating the container manipulator to engage with the container and move the container from the container loading location comprises operating the container manipulator to extend outside of the container receiving area, engage with the container outside of the container receiving area, and move the container into the container receiving area.

18. The container management system of claim 15, wherein operating the container manipulator to engage with the container and move the container to the container unloading location comprises operating the container manipulator to engage with the container in the container receiving area and move the container out of the container receiving area.

19. The container management system of claim 15, wherein the module is further operable to detect a distance to the container in the container loading location.

20. The container management system of claim 15, wherein the container loading location comprises a container holder and the container unloading location comprises a conveyor.

* * * * *